United States Patent
Peabody

(10) Patent No.: US 7,057,103 B1
(45) Date of Patent: Jun. 6, 2006

(54) TRANSMISSION TOWER DEVICES FOR REDUCING LONGITUDINAL SHOCK LOADS

(76) Inventor: Alan B Peabody, 12601 Turks Turn, Anchorage, AK (US) 99516

( * ) Notice: Subject to any disclaimer, the term of this patent is extended or adjusted under 35 U.S.C. 154(b) by 0 days.

(21) Appl. No.: 11/123,302

(22) Filed: May 6, 2005

Related U.S. Application Data

(60) Provisional application No. 60/568,698, filed on May 7, 2004.

(51) Int. Cl.
*H02G 7/20* (2006.01)
(52) U.S. Cl. .............. 174/45 R; 174/40 R; 174/45 TD
(58) Field of Classification Search .............. 174/1, 174/40 R, 40 CC, 40 TD, 41, 42, 43, 44, 174/45 R, 45 TD; 52/726.4
See application file for complete search history.

(56) References Cited

U.S. PATENT DOCUMENTS

| | | | | |
|---|---|---|---|---|
| 2,731,509 A | * | 1/1956 | Becker | 174/42 |
| 2,831,048 A | * | 4/1958 | Weaver | 174/42 |
| 3,647,933 A | * | 3/1972 | Okada et al. | 174/43 |
| 3,711,049 A | * | 1/1973 | Grannis | 174/40 R |
| 3,761,865 A | * | 9/1973 | Bomgaars et al. | 174/40 R |
| 3,973,078 A | * | 8/1976 | Wolf et al. | 174/42 |
| 4,388,487 A | * | 6/1983 | Petrossian-Avakian | 174/40 R |
| 4,523,054 A | * | 6/1985 | Baker et al. | 174/45 R |
| 4,615,154 A | * | 10/1986 | Troutner | 174/45 R |
| 4,791,243 A | * | 12/1988 | Ibanez et al. | 174/45 R |
| 4,854,541 A | * | 8/1989 | McConnell | 174/42 |
| 5,772,158 A | * | 6/1998 | Blanding | 174/45 R |
| 6,469,246 B1 | * | 10/2002 | Van Dyke et al. | 174/42 |

* cited by examiner

*Primary Examiner*—Dean A. Reichard
*Assistant Examiner*—Adolfo Nino
(74) *Attorney, Agent, or Firm*—Michael J. Tavella

(57) ABSTRACT

A device for reducing a shock load having a longitudinal direction along a power line coupled through an insulator to a crossarm of a transmission tower, comprising: a rotary damper coupled between the insulator and the crossarm for rotating by the insulator in the longitudinal direction in response to the shock load, the damper having an axle to which the insulator is rotatably coupled; and, a torsion bar coupled at a first end to the axle and at a second end to the crossarm for resisting rotation of the insulator, whereby at least a portion of the shock load is absorbed.

5 Claims, 37 Drawing Sheets

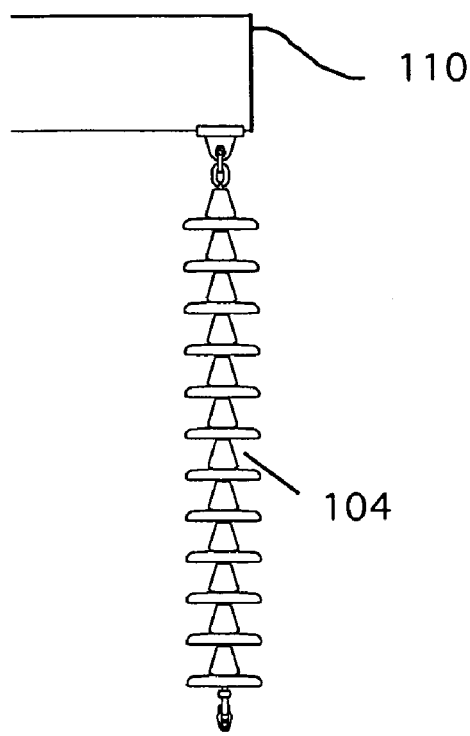
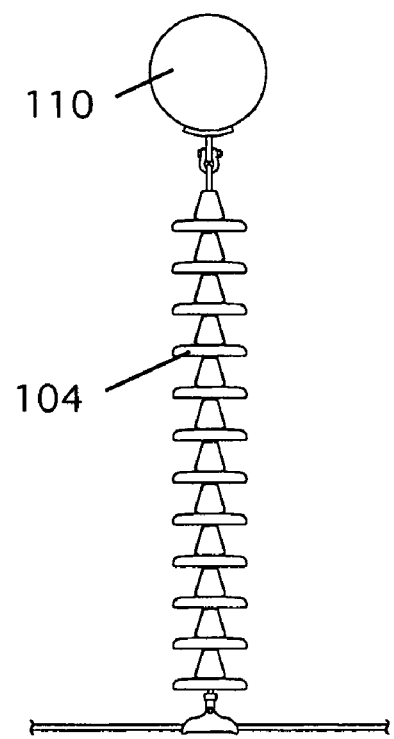
Figure 2
*Prior Art*
Figure 3
*Prior Art*

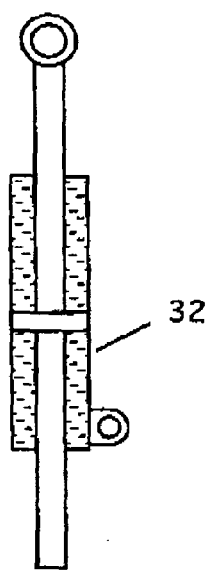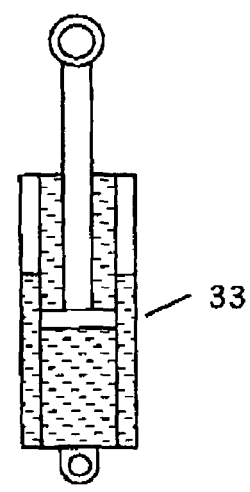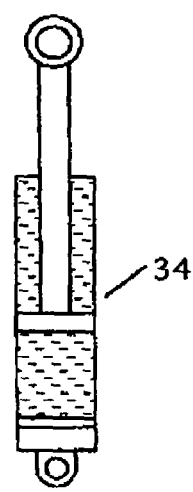
Figure 12
Prior Art
Figure 13
Prior Art
Figure 14
Prior Art

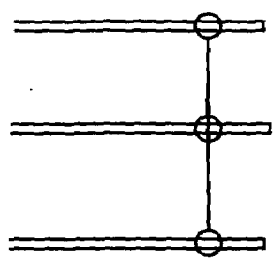 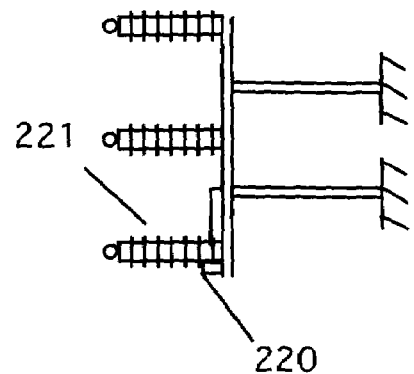
Figure 29a
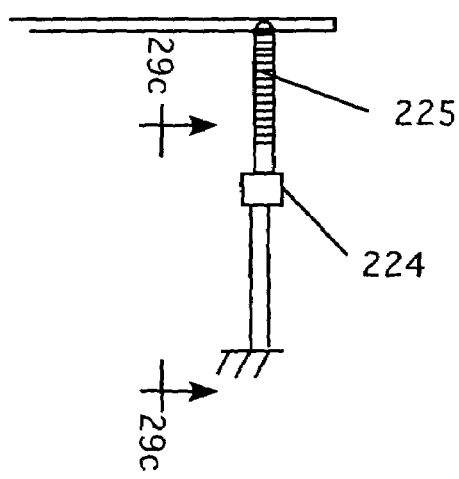 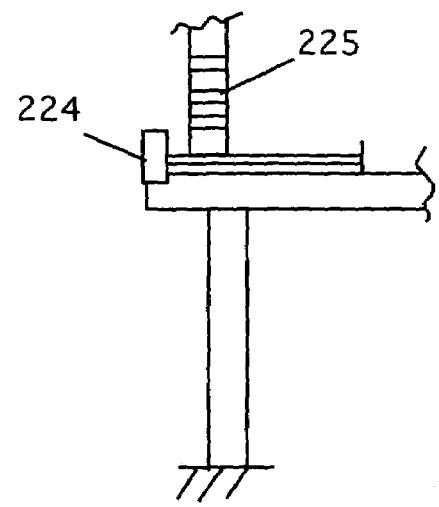
Figure 29b　　　　　　　　Figure 29c

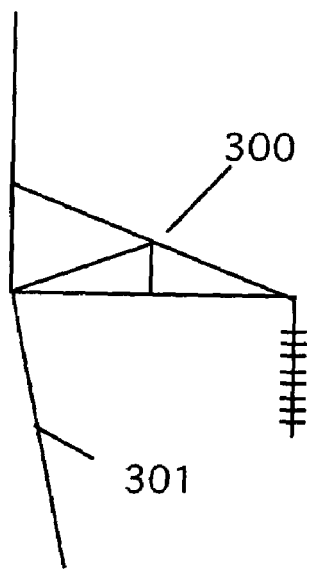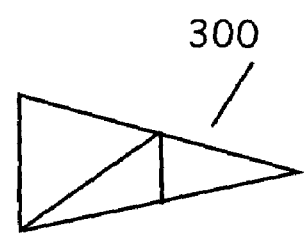
Figure 30a
Prior Art
Figure 30b
Prior Art

TRANSMISSION TOWER DEVICES FOR REDUCING LONGITUDINAL SHOCK LOADS

CROSS REFERENCE TO RELATED APPLICATIONS

This application claims the benefit of Provisional Application No. 60/568,698 filed May 7, 2004

STATEMENT REGARDING FEDERALLY SPONSORED RESEARCH AND DEVELOPMENT

Not Applicable

BACKGROUND OF THE INVENTION

1. Field of the Invention

This invention relates transmission tower devices for reducing longitudinal shock loads and particularly to transmission tower devices for reducing longitudinal shock loads using dampers.

2. Description of the Prior Art

Early in the 20th Century, the design and construction of high-voltage overhead electric 10 power lines began. In the nearly 100 years since those first lines were built, the progressive collapse of large numbers of structures has been a continuing problem. These large-scale progressive collapses are known today as "cascades".

Cascades are typically defined as the progressive collapse of more than two (or three) structures in either direction from an initial failure. In 1916, R. D. Coombs referred to lines "falling longitudinally like a 'house of cards'". More recently, there have been a number of major cascades in the U.S. and Canada including 18 steel tower cascades and 37 wood structure cascades in Quebec alone during the great ice storm of January 1998. Cascades can be devastating in their extent. In 1991, Iowa Power lost 108 km of line, including 269 structures, in one cascade; in the 1998 ice storm, 256 structures on Hydro-Quebec's Yamaska to Saint Cesaire line were lost in cascades.

While not all structural failures result in cascades, longitudinal cascades begin with a failure in the structural system that maintains tension in the overhead wires. These failures are represented most simply by a broken wire. Broken wires cause dynamic loads on the towers much higher than the intact wire tensions. Conceptually, the simplest event to trigger a cascade is the tension failure of a cable. Tension failures have been caused by ice overloads, aircraft strikes and damage due to gunshots, aeolian vibration, galloping and electrical arcing during short circuits.

FIG. 1 shows schematically a short section of a typical H-frame line annotated to show the conductors, shield wire, a suspension insulator assembly, a dead-end insulator assembly and tangent and dead-end structures. There are approximately 800,000 circuit kilometers of transmission line 69 kV and above in the United States. Suspension insulator assemblies on tangent structures are perpendicular to the wires and do not support the tension in the wires. At small angles in the line, they will carry the component of wire tension due to the change in direction of the wires. Dead-end insulator assemblies are in-line with the wires and must carry the full wire tension. Most of the structures in a line will be basic tangent structures. The other Structures are used only at the ends of the line and when needed due to changes in the direction of the line or uneven terrain. The problem of preventing cascades centers on the design of the basic tangent structure for longitudinal loads. With intact wires, the tangent structures may see some longitudinal load during construction or when some spans are loaded with ice and other spans are bare. These loads are generally much smaller than those that can occur when a wire breaks. Tests have shown that a tower, which normally is subjected to very small longitudinal loads, can experience very high dynamic longitudinal loads after a failure in the wire tensioning system. These tests have shown that the impact loads on the intact structures from longitudinal disturbances to the wire tensioning system can be as much as four times the residual static loads.

Using special mechanical devices to limit the longitudinal loads due to broken wires and other longitudinal disturbances dates back to the earliest days of transmission line construction. Sliding clamps to limit longitudinal loads were being tried as early as 1910. The use of hinged crossarms was reported in 1928. More recently, crossarms have made purposefully weaker than the rest of the tower to force failures to occur in them rather than in the tower have been used. In addition, bendable link crossarms, insulators with deformable bases, and energy absorption devices have also been used. For example, U.S. Pat. No. 4,791,243 to Ibanez et al. discloses a compact device for long stroke energy absorption that is installed between an insulator and a tower arm. The device consists of two flat steel discs cut so that they will unwind under load into a spiral. However, few of these devices have been successful commercially.

Devices have also be designed to counter "cable galloping" which is a longitudinal disturbance that can occur when ice accretes unevenly on a cable forming an airfoil that can develop lift. For example, rotary friction dampers having a longitudinal V-string of suspension insulators (acting only in tension) to rotate the damper have been proposed to counter galloping. However, such devices are ineffective in countering the impact of broken wire loads that can lead to a cascade.

A need therefore exists for effective means to reduce shock loads on transmission towers during cascades and other longitudinal disturbances. Consequently, it is an object of the present invention to obviate or mitigate at least some of the above-mentioned disadvantages.

BRIEF DESCRIPTION OF THE INVENTION

According to one aspect of the invention, there is provided a device for reducing a shock load having a longitudinal direction along a power line coupled through an insulator to a crossarm of a transmission tower. The device includes: a rotary damper coupled between the insulator and the crossarm for rotating by the insulator in the longitudinal direction in response to the shock load, the damper having an axle to which the insulator is rotatably coupled; and, a torsion bar coupled at a first end to the axle and at a second end to the crossarm for resisting rotation of the insulator, whereby at least a portion of the shock load is absorbed.

Preferably, the insulator can be a composite post insulator, a porcelain post insulator, or a post.

Preferably, the rotary damper can be a rotary viscous damper, a rotary vane damper, or a rotary friction damper.

According to another aspect of the invention, there is provided a device for reducing a shock load having a longitudinal direction along a power line coupled through an insulator to a crossarm of a transmission tower. The device includes: a rotary damper coupled between the crossarm and the tower for rotating by the crossarm in the longitudinal direction in response to the shock load, the damper having an axle to which the crossarm is rotatably coupled; and, a torsion bar coupled at a first end to the axle and at a second end to the tower for resisting rotation of the crossarm, whereby at least a portion of the shock load is absorbed.

Preferably, the rotary damper includes a rotary viscous damper, a rotary vane damper, and a rotary friction damper.

Advantageously, the post spring-damper and the rotating crossarm spring-damper are effective in reducing the peak impact loads on towers and thus the potential for lines to cascade. The spring-dampers of the present invention allow for the manufacture of consistent products having consistent results. This is advantageous when compared to devices that use deformable components as the consistency of such components is difficult to ensure. In addition, the operation of the spring-dampers of the present invention is independent of span weight. This is advantageous when compared to devices that use sliding clamps as such devices require calibration for span weight, aging, preloading of clamp keepers, etc. Furthermore, the spring-dampers of the present invention operate only under longitudinal loads. This is advantageous when compared to devices such as that of Ibanez et al., which operate on the resultant of the vertical, transverse, and longitudinal loads. Moreover, the spring-dampers of the present invention are advantageous in that they do not need to be replaced after operation.

According to another aspect of the invention, there is provided a longitudinal V-insulator. Advantageously, the longitudinal V-insulator can be rigidly attached to a crossarm to control the movement of wire from span to span. In addition, it can be combined with a spring, a damper, or a spring and damper combination.

According to another aspect of the invention, there is provided a square crossarm having a telescopic damper. Advantageously, the shock absorbing square crossarm absorbs at least some of the energy released during a broken wire event and reduces the residual static tension in the wires due to the movement of the insulator attachment point into the intact span.

BRIEF DESCRIPTION OF THE DRAWINGS

FIGS. 2 and 3 are front and side views, respectively, illustrating a typical 230 kV porcelain suspension ("I-String") insulator assembly as prior art.

FIGS. 12, 13 and 14 are side views illustrating typical through-rod, double rod, and single tube (with floating piston) telescopic dampers, respectively.

FIG. 29a is a top view illustrating a spring-damper for a bus or transformer in accordance with an embodiment of the invention.

FIG. 29b is a side view illustrating a spring-damper for a bus or transformer in accordance with an embodiment of the invention.

FIG. 29c is a side view illustrating a spring-damper for a bus or transformer in accordance with an embodiment of the invention.

FIG. 30a is a side view illustrating a typical triangular arm for a transmission tower as prior art.

FIG. 30b is a side view illustrating a typical triangular arm for a transmission tower.

DETAILED DESCRIPTION OF THE INVENTION

In the following description, numerous specific details are set forth to provide a thorough understanding of the invention. However, it is understood that the invention may be practiced without these specific details. In other instances, well-known structures and techniques have not been described or shown in detail in order not to obscure the invention.

The present invention provides means for reducing the peak loads on transmission towers due to broken wires and other disturbances to the wire tensioning system.

Figure 1:
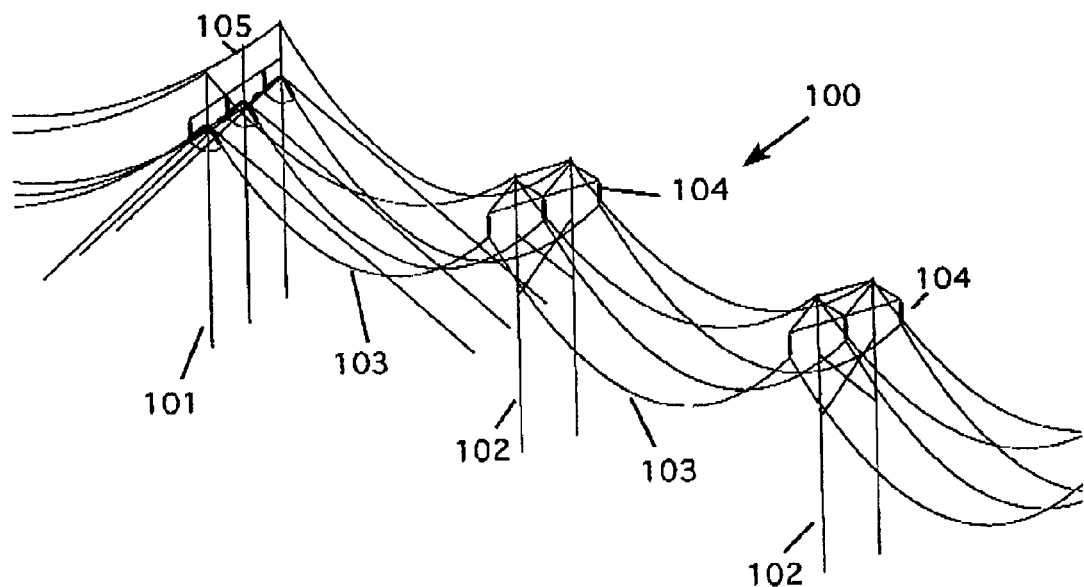
FIG. 1 is a schematic perspective view illustrating a typical section of H-frame transmission tower line as prior art.

FIG. 1 is a schematic perspective view illustrating a typical section of H-frame transmission tower line 100 as prior art. The line 100 is made up of a deadend tower 101 and H-frame tangent structures 102. Conductors 103 are suspended by string insulators 104. At the top of the structures is a shield or static wire 105.

Figure 4:
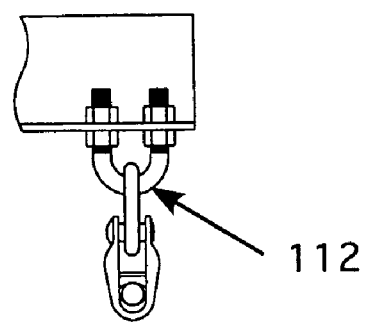
FIGS. 4 and 5 are front and side views, respectively, illustrating a typical shield wire suspension assembly as prior art.
Figure 5:
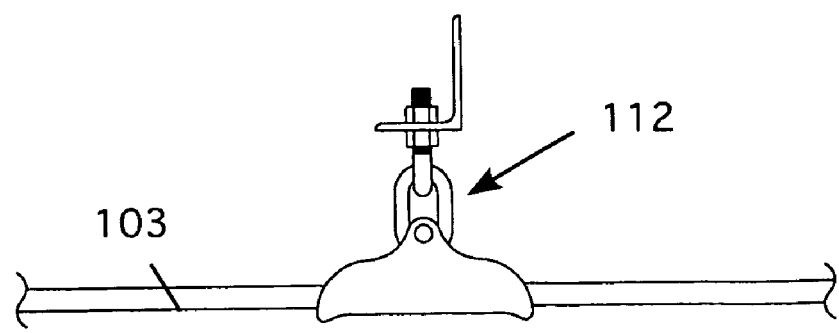

FIGS. 2 and 3 are front and side views, respectively, illustrating a typical 230 kV porcelain suspension ("I-String") insulator assembly 104 as prior art, shown attached to a tower crossarm 110. FIGS. 4 and 5 are front and side views, respectively, illustrating a typical shield wire suspension assembly 112 as prior art. As discussed above, transmission line cascades are caused by the large unbalanced longitudinal loads on tangent suspension towers that occur when the tension in the wires is released due to failures in the structural system that maintains that tension. The peak impact loads can be substantially higher than the tension in the wires at the time of the failure.

According to the present invention, structural dampers are added to high voltage electric transmission towers to reduce the dynamic forces on the towers, when the wires supported by those towers experience a sudden loss of tension. This loss of tension may be due to breaks in the wires themselves or other failures in the structural systems that maintain tension in the wires. Adding supplemental springs and mechanical dampers to electric transmission towers can help control the dynamic forces on towers that lead to cascades.

Two new and effective methods of incorporating springs and dampers into towers are the "post spring-damper" and the "rotating crossarm spring-damper". These spring-dampers substantially reduce the peak dynamic loads while dissipating a large fraction of the total energy released by broken wires and other longitudinal disturbances. In addition, a longitudinal V-string insulator assembly incorporating composite post insulators is described.

Figure 6:
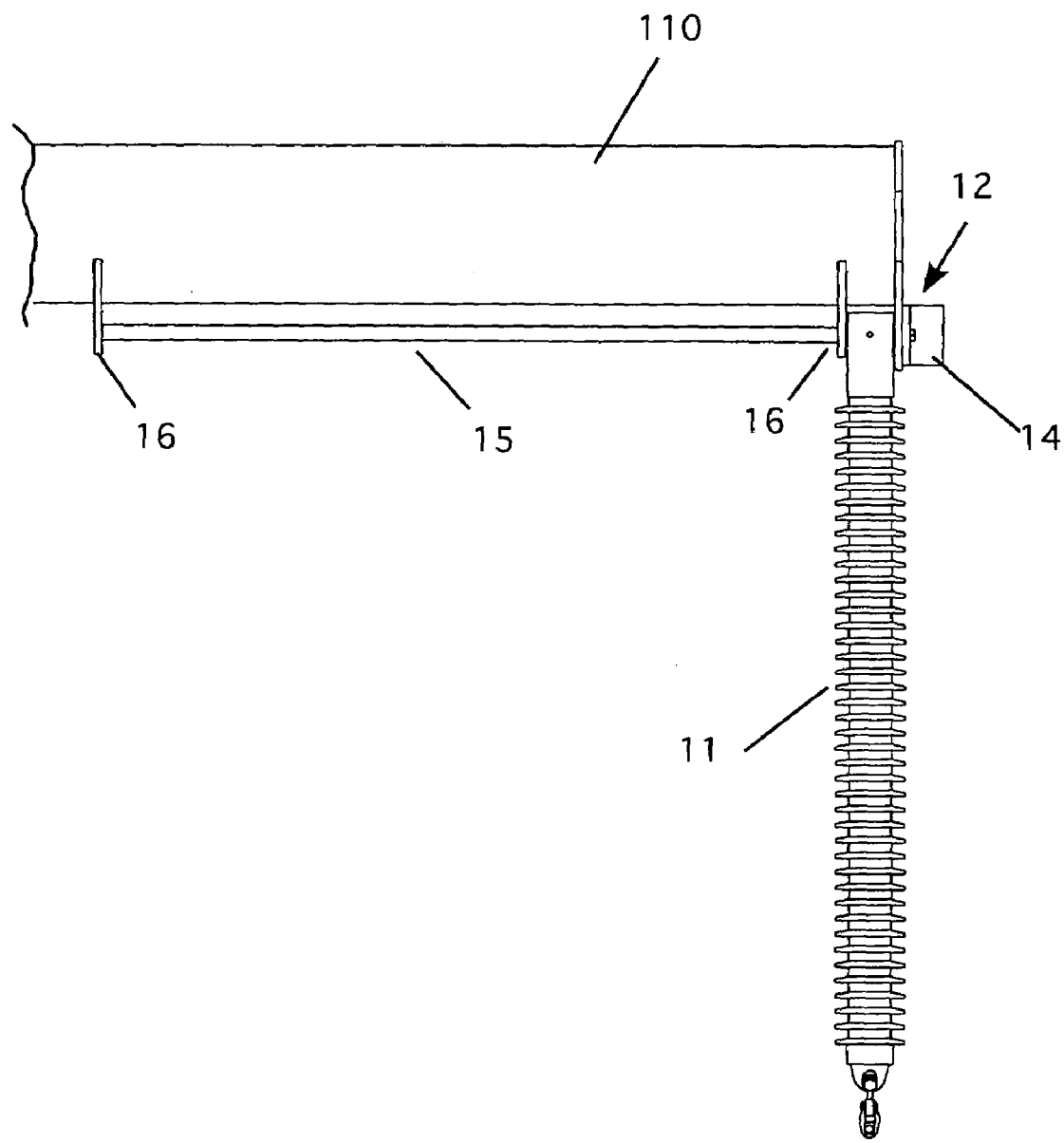
FIGS. 6 and 7 are front and side views, respectively, illustrating a post spring-damper in accordance with an embodiment of the invention.
Figure 7:
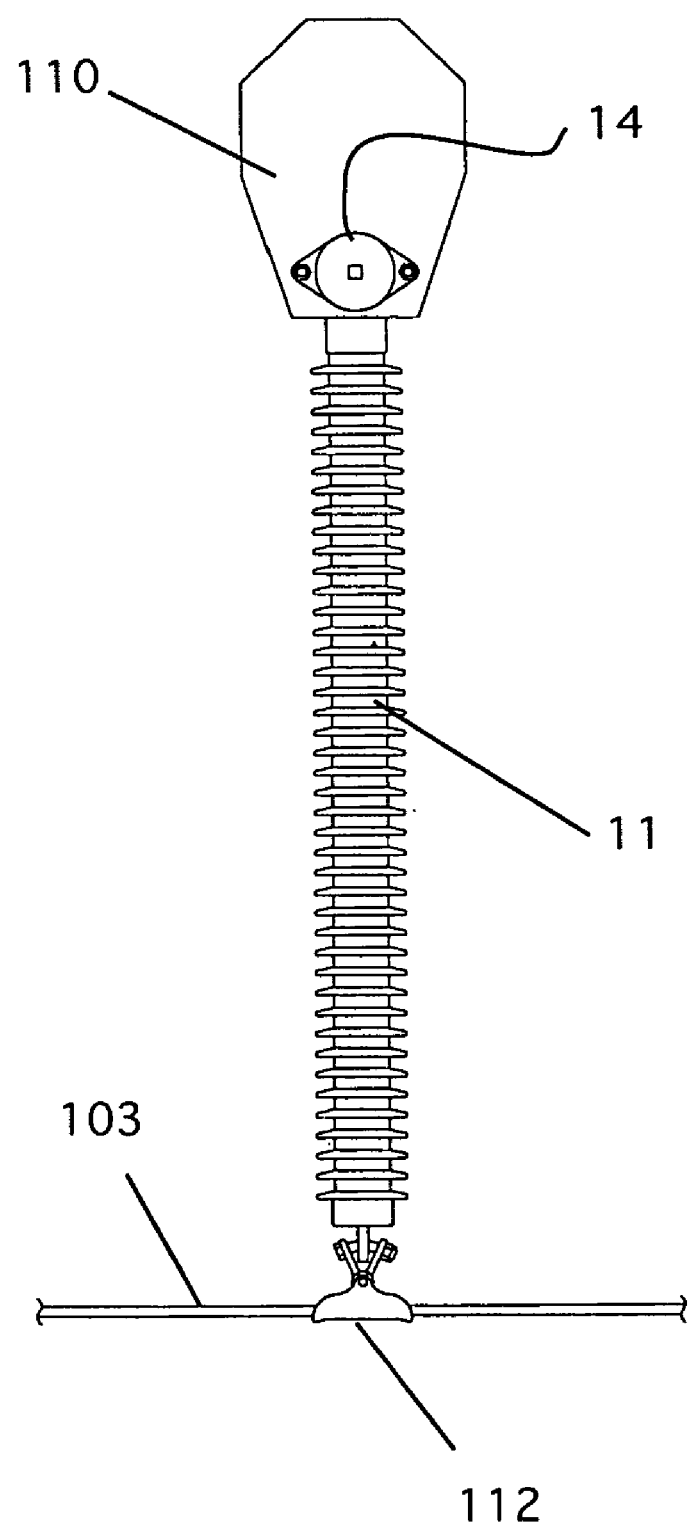

FIGS. 6 and 7 are front and side views, respectively, illustrating a post spring-damper 10 in accordance with an embodiment of the invention. For the conductor, this spring-damper uses a composite post insulator 11 (i.e., an insulator designed for cantilever loads) connected to the tower through a rotational spring-damper system 12 as shown. In FIGS. 6 and 7, a crossarm 110 is used to suspend the post insulator 11. A rotary damper 14 is attached to the crossarm (see FIG. 7). A torsion bar spring 15 is attached to the damper by passing it through the post insulator. Two plates 16 support the torsion bar on the crossarm. The insulator 11 supports a conductor 103 held by a suspension clamp 112 in the usual manner common to the art. The same system, using a post made from any suitable material in place of the post insulator, may be used for attaching the shield wire to the structure.

In operation, when there is a sudden longitudinal imbalance in the wire tension (e.g., the conductor 103 breaks), the wire 103 moves longitudinally, causing the post insulator 11 to rotate. The rotation of the post is resisted by the torsional spring 15. As the base of the post rotates, the damper 14 absorbs part of the kinetic energy.

In addition to reducing the peak impact loads on electric transmission and distribution structures due to broken wires and other longitudinal disturbances, the post spring-damper of the present invention is also effective in reducing the amplitude of galloping. For energized wires and cables, this system uses a composite post insulator (i.e., an insulator designed for cantilever loads) as the post. For grounded wires and cables, a post constructed of any suitable material may be used.

Figure 8:
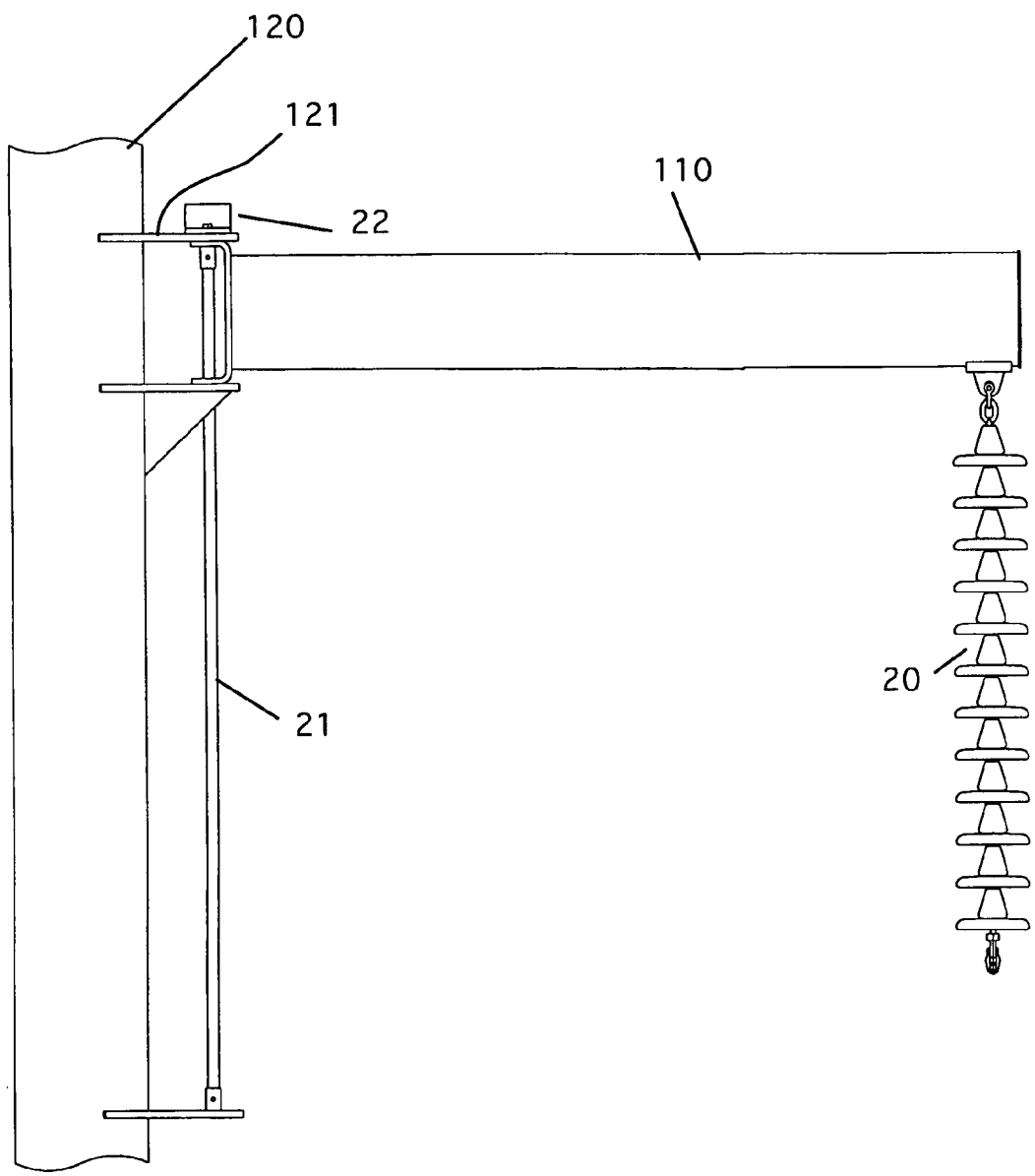
FIGS. 8 and 9 are front and side views, respectively, illustrating a rotating crossarm spring-damper in accordance with an embodiment of the invention.
Figure 9:
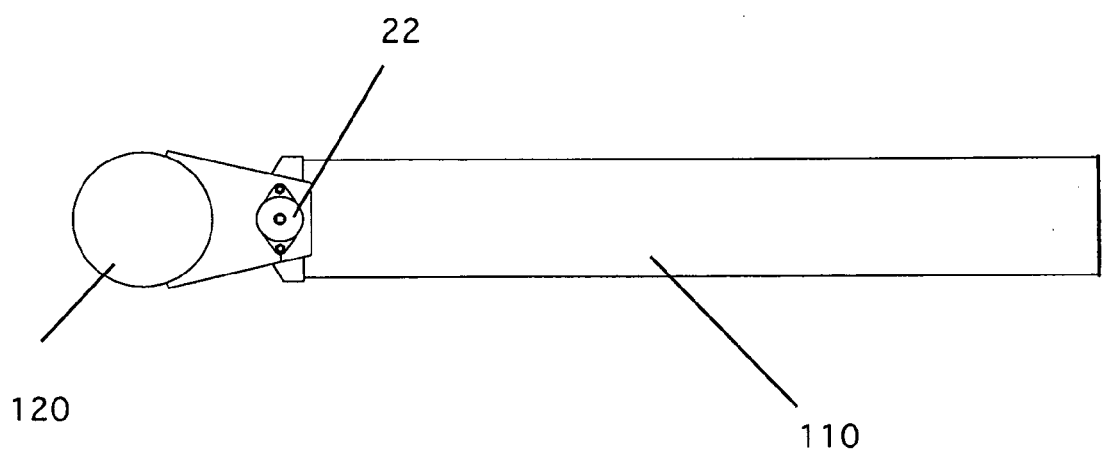

FIGS. 8 and 9 are front and side views, respectively, illustrating a rotating crossarm spring-damper in accordance with another embodiment of the invention. In this embodiment, a standard suspension insulator 20 attaches the wire to the crossarm 110. The crossarm 110 is attached to the tower 120 using a vertical axle 121. A torsion bar spring 21 and a rotary damper 22 are attached between the rotating arm 110 and the tower 120. When tension is lost on one side of the insulator, the suspension insulator 20 swings in line with the conductor pulling longitudinally on the end of the crossarm. This causes the crossarm 110 to rotate about its vertical axle 121 at the tower body. This motion is resisted by the torsion bar spring 21, with the damper 22 absorbing part of the rotational kinetic energy.

Like the post spring-damper, the rotating crossarm spring-damper is effective in reducing the peak impact loads on electric transmission and distribution structures due to broken wires and other longitudinal disturbances. In the rotating crossarm spring-damper, a spring and damper are applied to a rotating crossarm to absorb the energy released by a longitudinal disturbance such as a broken wire. This spring damper may be applied on new towers or for retrofitting some existing tower types.

The tower crossarm, rather than being fixed, is attached at the tower end to an axle, either vertical or inclined, about which it rotates. The axle is attached to a spring and damper. The springs can be either coil springs attached though a linkage or a torsion bar extending from the end of the axle. The damper can be either a rotary damper or telescopic dampers connected with a linkage. When a broken wire or other longitudinal disturbance occurs, the suspension insulator is pulled in line with the wire which then causes the crossarm to rotate on its axle. The rotation is resisted by the spring and part of the kinetic energy is absorbed by the damper.

Analytic studies prepared by the applicant have shown that adding a spring and a damper to a rotating crossarm is effective in reducing peak dynamic loads. Such a damper can dissipate approximately one-half the energy released by a broken wire. Interestingly, using a freely rotating crossarm, that is, one without a damper, does not reduce the peak longitudinal dynamic load on the tower. This is true whether the axis of rotation is vertical or inclined. If anything, the peak impact loads are actually higher for freely swinging rotating crossarms than they are for a suspension insulator on a rigid crossarm. When rotating crossarms are used, if no spring is included, an inclined axis should be used to prevent excessive rotation of the arms.

Figure 10:
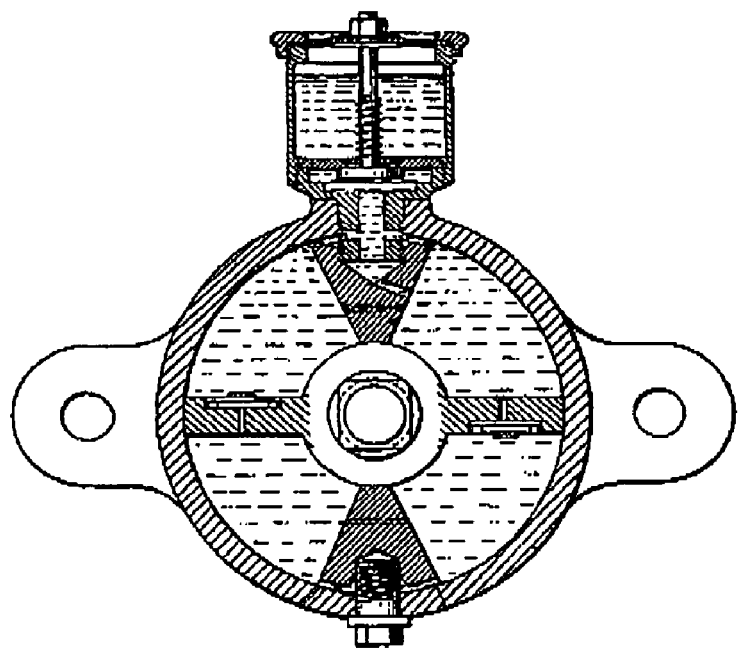
FIGS. 10 and 11 are side views illustrating typical rotary vane dampers.
Figure 11:
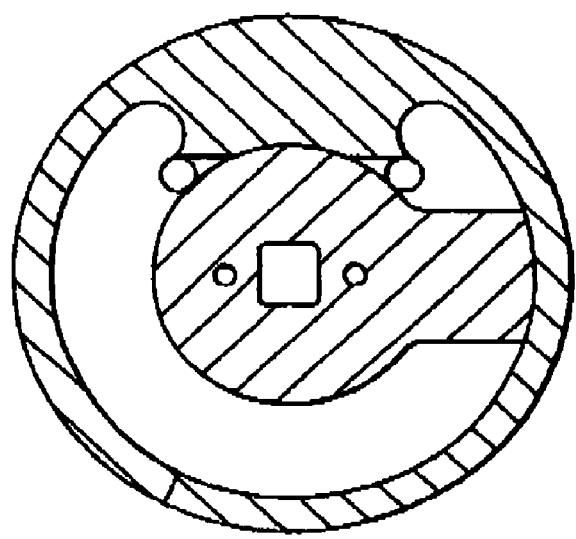
Figure 15:
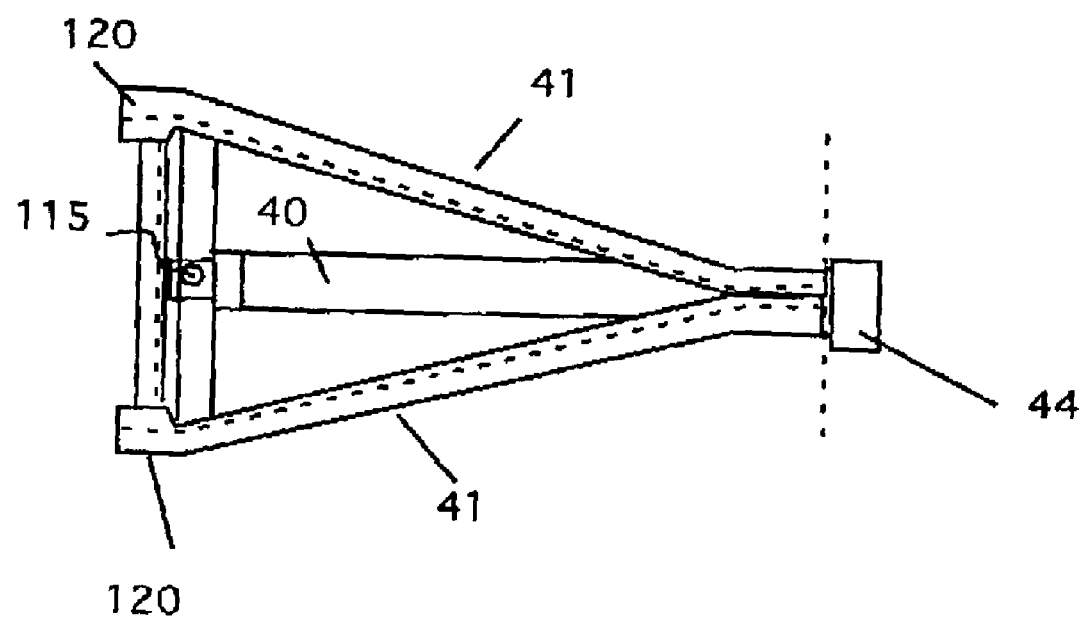
FIG. 15 is a top view illustrating a post spring-damper with a torque tube in accordance with an embodiment of the invention.
Figure 16:
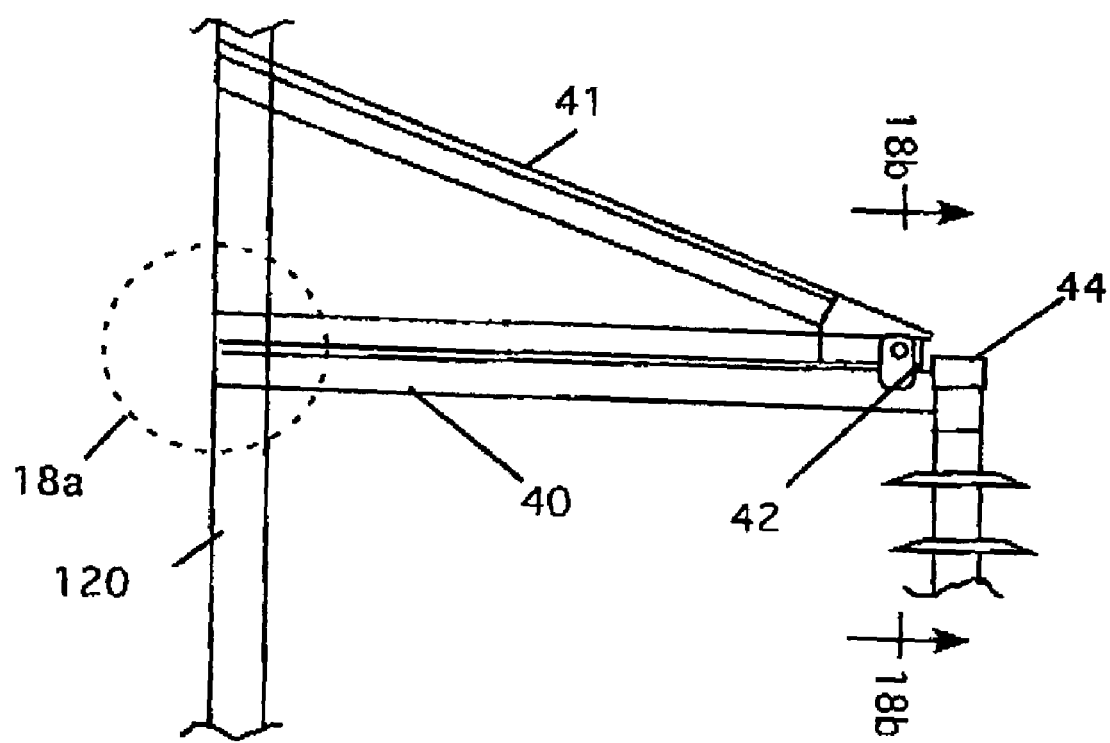
FIG. 16 is a front view illustrating a post spring-damper with a torque tube in accordance with an embodiment of the invention.

As mentioned above, both the post and rotating crossarm spring-dampers include dampers. Three of the many types of dampers are the rotary viscous damper, the rotary vane damper and the telescopic damper. FIGS. 10 and 11 are side views illustrating typical rotary vane dampers 30 and 31. Rotary vane dampers are used in a variety of applications including suspension systems for tracked vehicles. Modern automobiles use telescopic dampers almost exclusively. Telescopic dampers are also furnished as seismic dampers for civil engineering structures. FIGS. 12, 13, and 14 are side views illustrating typical through-rod 32, double rod 33, and single tube (with floating piston) telescopic dampers 34, respectively. In addition to the dampers shown, typical coil-spring loaded disc, coil-spring loaded spool, and shim disc (double acting) valves, may also be used.

As discussed above, in discussing the embodiment of FIGS. 6 and 7, when there is a sudden longitudinal imbalance in the wire or cable tension (along the direction of the wire), the wire moves longitudinally, causing the post to rotate. The rotation of the post is resisted by the torsional spring. As the base of the post rotates, the rotation of the damper absorbs kinetic energy. In certain cases, no spring is needed. Now, many lattice steel towers have crossarms with very low torsional strength, in this case, the post spring-damper can be modified as shown in FIGS. 15–20.

FIGS. 15–18 include top, front, and side views illustrating a post spring-damper with a torque tube in accordance with this embodiment of the invention. In this embodiment, a torque tube 40 is attached to the tower body 120 and crossarm 41 (see FIG. 16) using a method that resists turning of the tube about its axis (in this case, a universal joint 115 (see also FIG. 18a). The torque tube is attached to the original insulator attachment 42 at the end of the arm with a connection that transmits no torsion to the end of the arm. A torsional spring and damper can be installed inside the tube 40, with the insulator attached to an axle cantilevered from the end. The connection of the torque tube to the tower can also be made in such a way that the damper 44 can be mounted externally at the tower end with either a rotary damper or telescopic dampers, as shown. If the axle is made relatively stiff in torsion, the springs can be coil springs mounted around the telescopic dampers or used with the same type of linkage and a rotary damper. A torsion bar spring can also be mounted externally from one side of the tower body to the other.

Figure 18A:
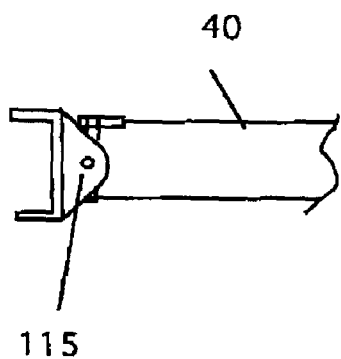
FIG. 18a is a detail view of a section of the torque tube of FIG. 16 showing a universal joint.
Figure 18B:
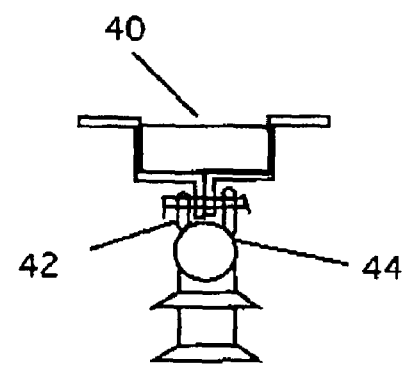
FIG. 18b is a detail view of the top of the insulator string taken along the lines 18b–18b of FIG. 16.
Figure 17:
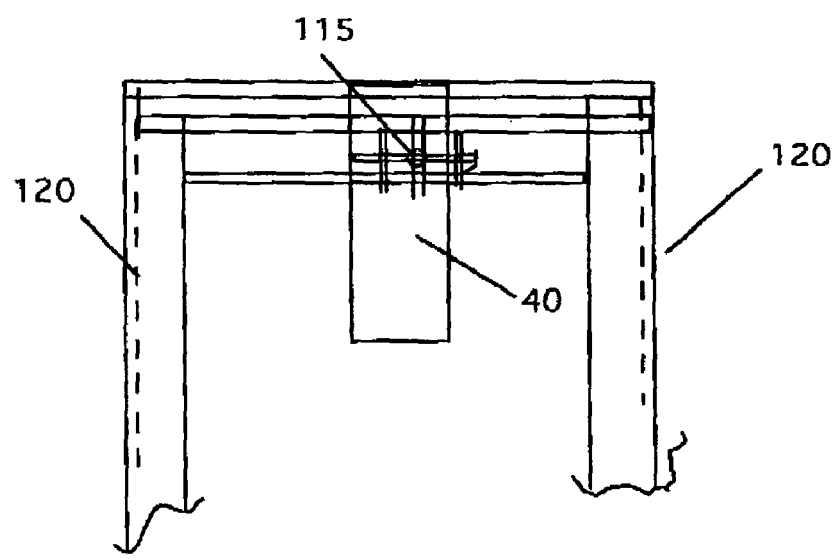
FIG. 17 is a side view illustrating a post spring-damper with a torque tube in accordance with an embodiment of the invention

FIG. 17 shows the connection from the tower end. FIG. 18a is a detail of the universal joint 45. FIG. 18b is a side detail of the rotary damper 44 connection to the insulator.

Figure 19:
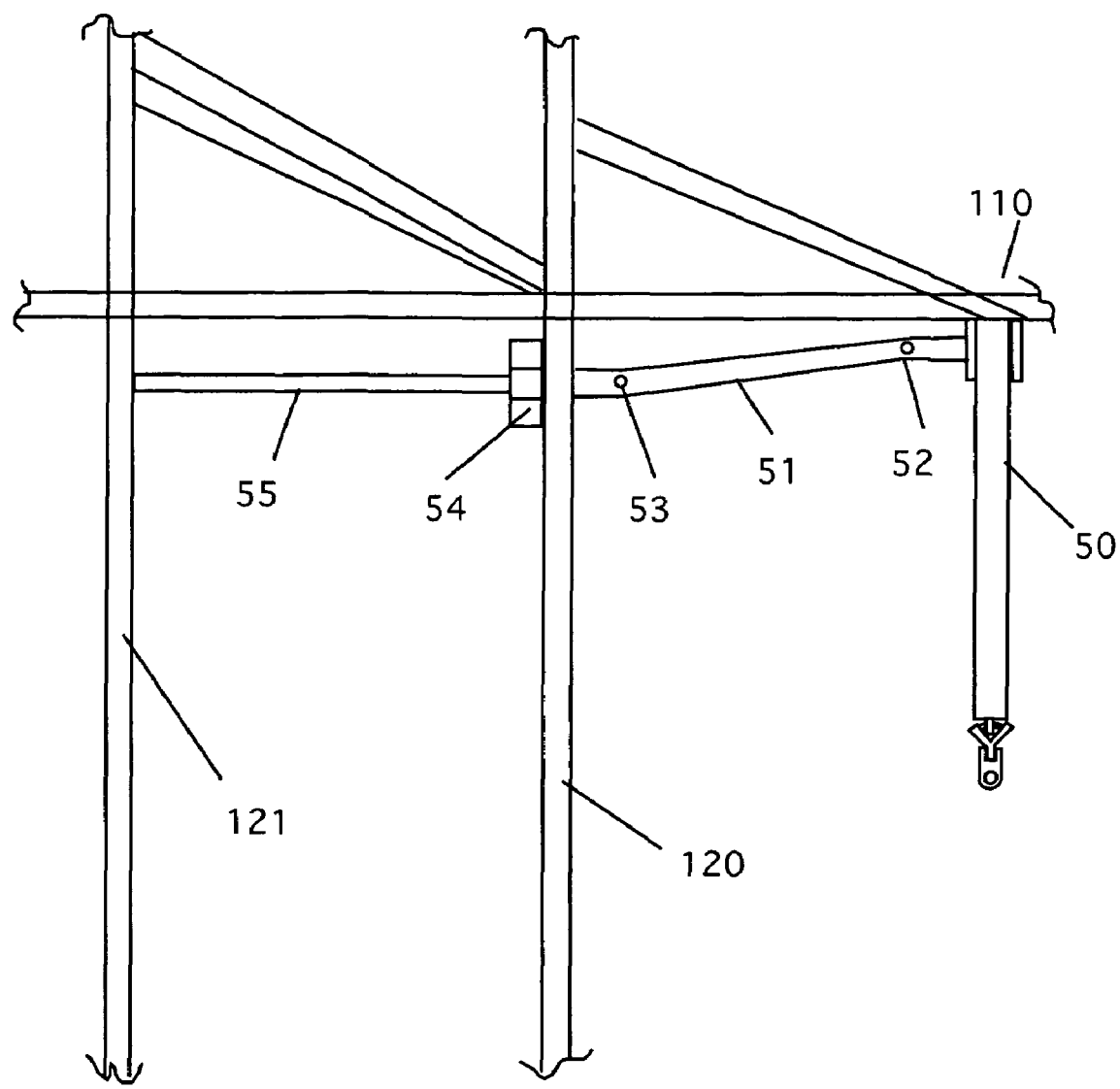
FIG. 19 is a front illustrating a post spring-damper having a torque tube with a universal joint in accordance with an embodiment of the invention
Figure 20:
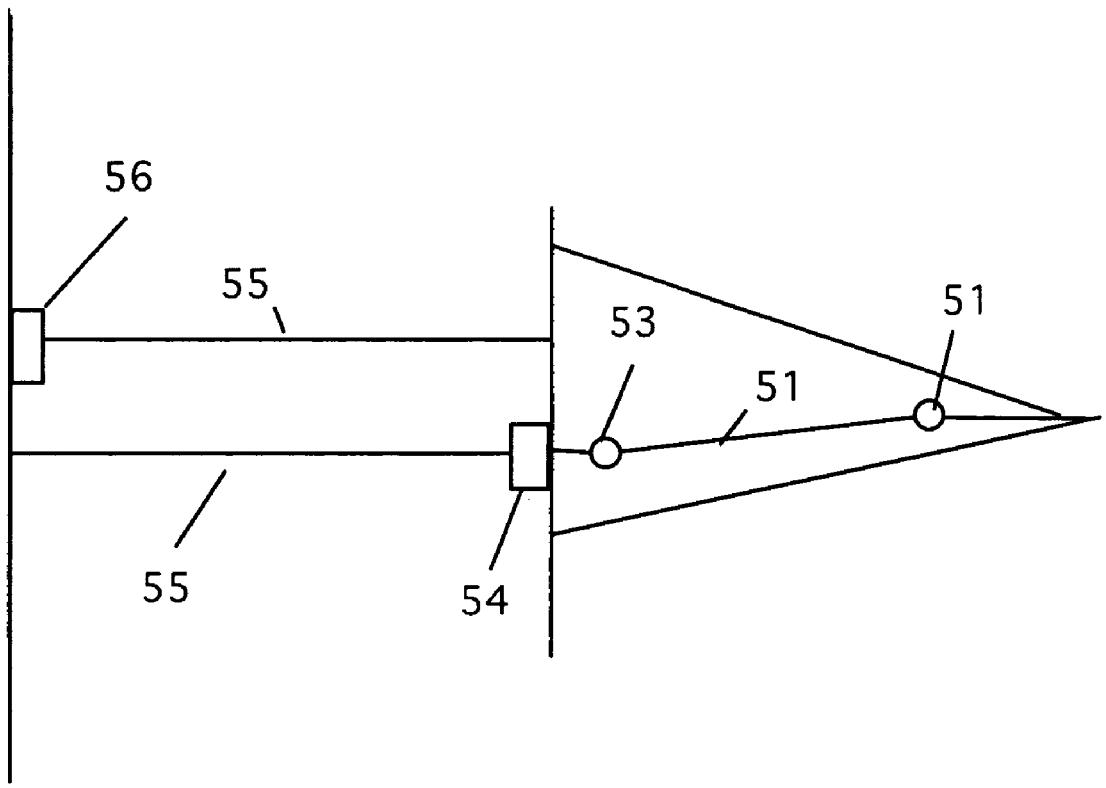
FIG. 20 is a top view illustrating a post spring-damper having a torque tube with a universal joint in accordance with an embodiment of the invention.

FIGS. 19 and 20 include top and front views illustrating a post spring-damper having a torque tube with a universal joint in accordance with another embodiment of the invention. In this embodiment, the torque is transmitted from the rotating insulator to a drive shaft or torque tube that may have its direction changed by using universal joints. As shown if FIG. 19, the insulator 50 is attached to the crossarm 110 as shown. The torque tube 51 is attached to the insulator using a universal joint 52. The torque tube attaches to the tower pole 120 by means of a second universal joint 53. The damper 54, either rotary or telescopic, is mounted at the tower body 120 as are either coil springs or a torsion bar spring 55, which anchored on the opposite face of the tower 121 as shown. FIG. 20 shows a case where two torsion bars 55 are attached to the tower and a second damper 56 is attached to the opposite tower. For all of the post spring-damper embodiments described above, strut insulators can be added for transverse loads, where necessary.

For all of the post spring-damper embodiments described above, strut insulators can be added for transverse loads, where necessary.

Advantageously, the post spring-damper reduces the dynamic loads associated with broken wires and cables and other longitudinal disturbances to overhead wire and cable systems. In addition, the post spring-damper has the potential to damp the first symmetric vibration mode of galloping wires and cables reducing the amplitude of the galloping. The post spring-damper can be installed in new electric power lines and retrofitted to existing lines. The use of a post insulator that has tension, compression and bending capacity can much more effectively rotate the damper. In addition, the use of a viscous damper means that the system is inherently self-centering as the motion stops.

As mentioned, the post spring-dampers of the present invention are effective in reducing the peak dynamic loads on the towers. Without damaging the tower, the absolute minimum to which the peak load on the tower next to a broken wire can be reduced is the residual static load at that tower. One measure of the effectiveness of the post spring-damper is to compare the amount of the reduced peak load with this maximum possible reduction. Analytic studies prepared by the applicant have shown that the post spring-damper of the present invention achieves 50 to 80% of this maximum possible reduction. In addition, a comparison of the angles of post swing found that the addition of dampers substantially reduces the range of angles through which posts swing. The much smaller variations in the swing angles around the residual static position for the damped posts compared with the undamped posts shows the effectiveness of the dampers in reducing the kinetic energy in the system. The dampers are effective at dissipating the energy released by a broken wire. Analytic studies have shown that 70 to 90% of the energy released is dissipated by the dampers. In general, the damper at the tower next to the break dissipates the most energy.

Figure 21:
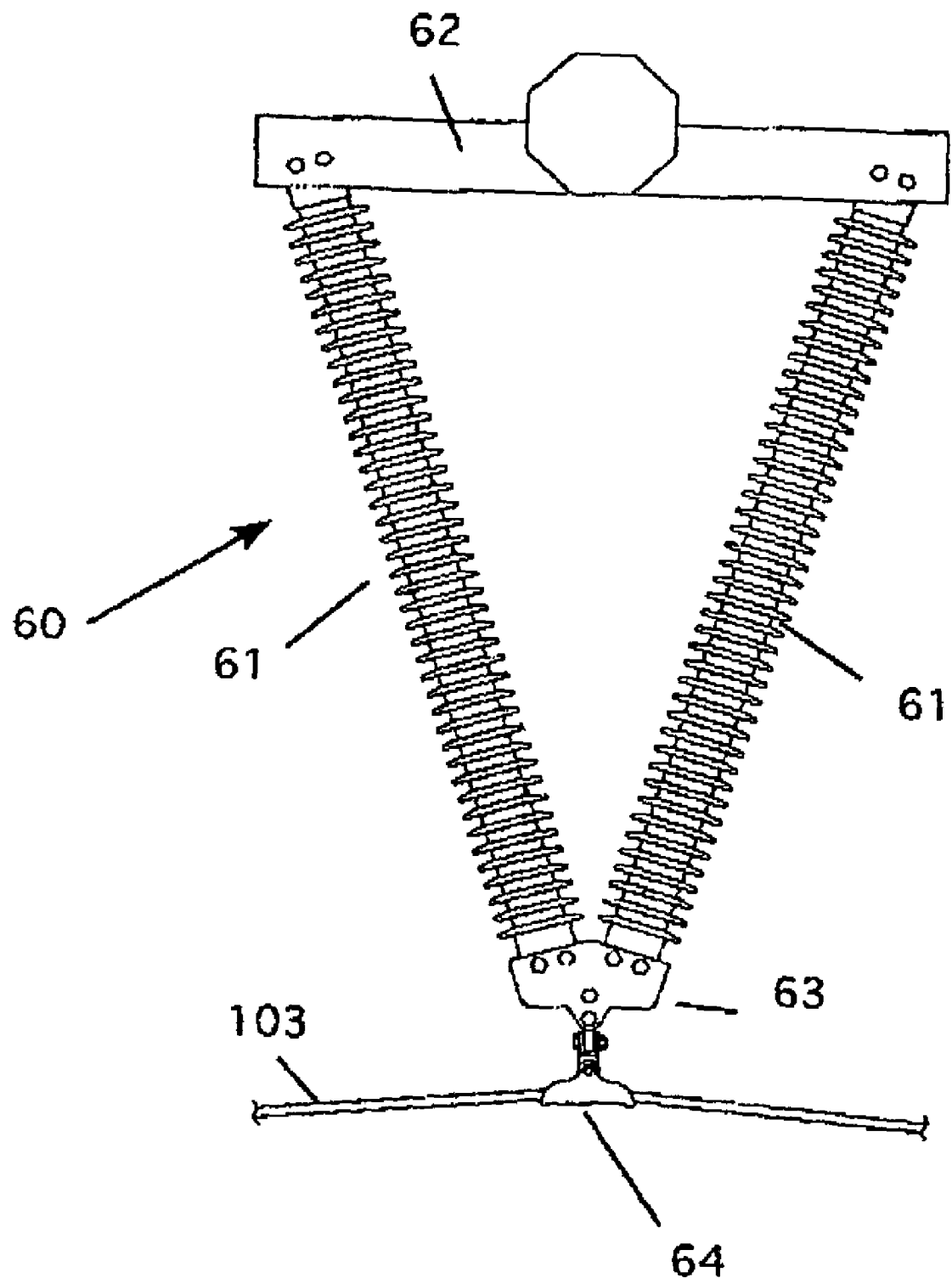
FIG. 21 is an elevation view illustrating a longitudinal V-string insulator in accordance with an embodiment of the invention.

FIG. 21 is an elevation view illustrating a longitudinal V-string insulator in accordance with an embodiment of the invention. At present, the diameter of composite post insulators is limited with the largest being approximately 3.5 inches in diameter. Because this limits the bending strength available in the post, a longitudinal V-string insulator using brackets at the top and bottom and two composite post insulators can be used to allow much higher forces to be transmitted to the spring-damper system.

The longitudinal V-string insulator can be rigidly attached to a crossarm to control the movement of wire from span to span. In addition, it can be combined with a spring, damper, or spring and damper combination. Furthermore, the longitudinal V-string insulator can be installed upside-down to restrain the movement of wire in place of a dead-end.

FIG. 21 shows the longitudinal V structure 60 having a pair of insulators 61 that are secured to a bracket 62 at the top and a bracket 63 at the bottom, as shown. A standard strain clamp assembly 64 is used to attach a conductor 103, in the usual manner.

Figure 22:
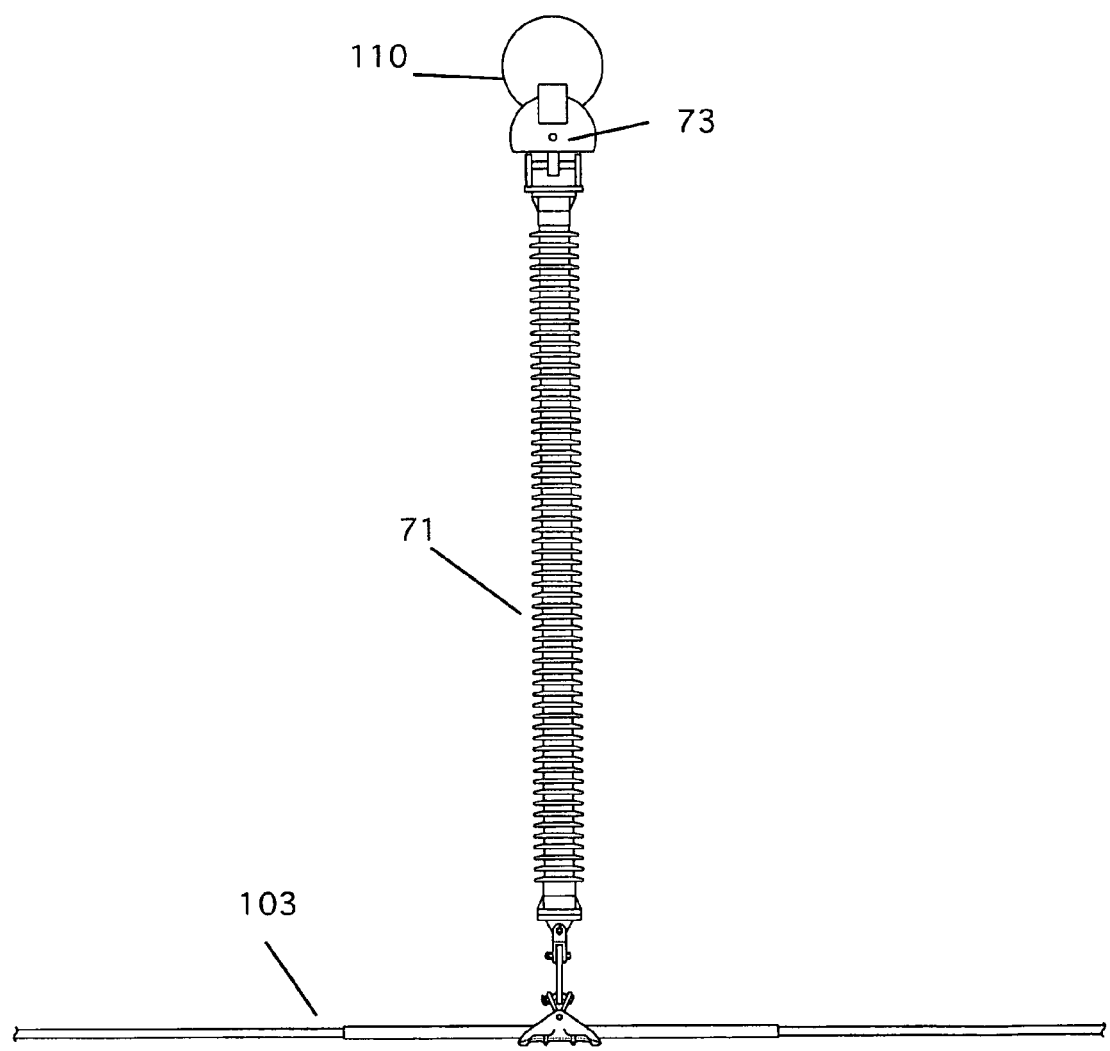
FIGS. 22 and 23 are side and front views, respectively, illustrating a post spring-damper 20 including a rotary friction damper in accordance with an embodiment of the invention.
Figure 23:
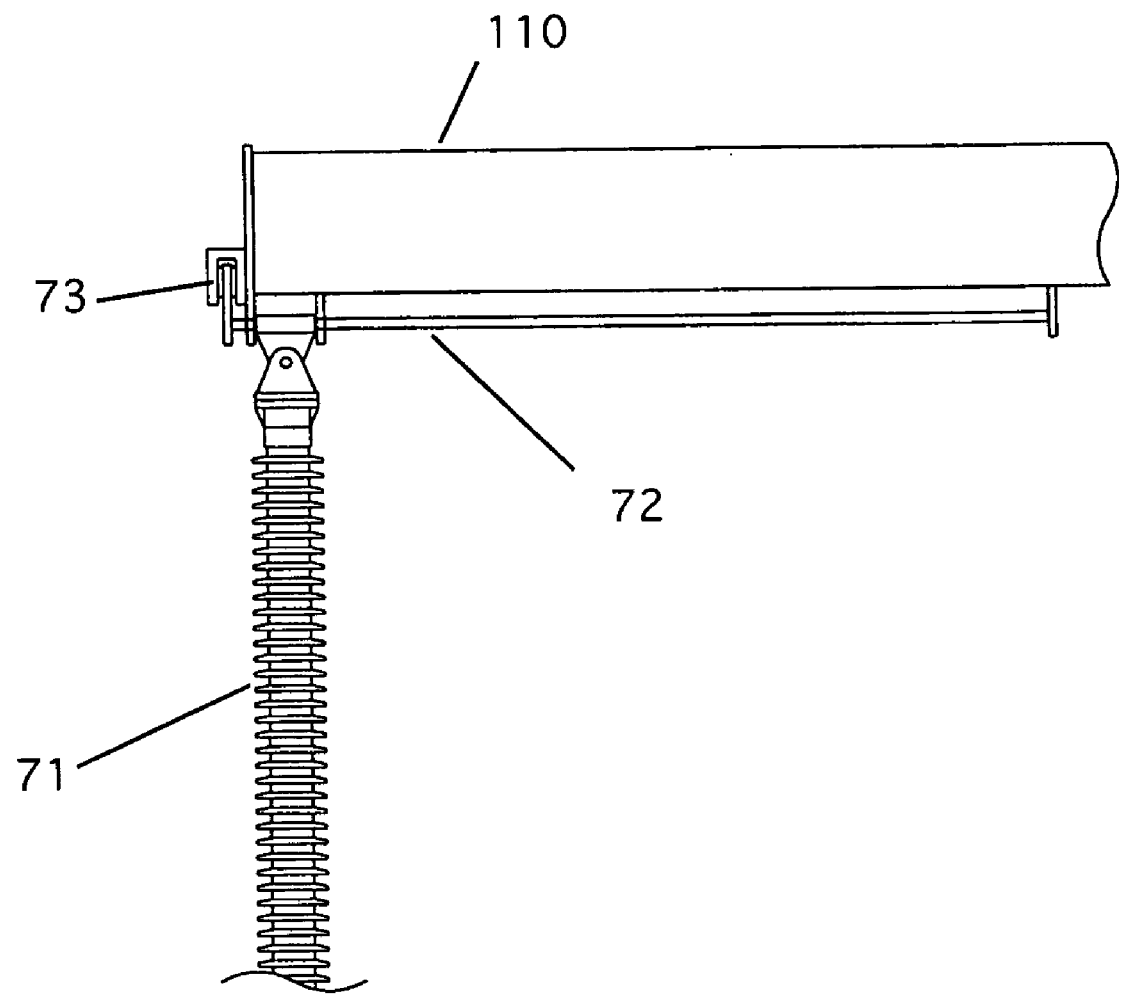

FIGS. 22 and 23 are side and front views, respectively, illustrating a post spring-damper including a rotary friction damper in accordance with an embodiment of the invention. The post insulator damper consists of a composite post insulator 71, a torsion bar 72 and a rotary damper 73. For vertical and transverse loads, the post insulator functions similar to a suspension insulator, swinging freely to the side. For longitudinal loads, the post insulator is connected rigidly to the torsion bar 72, which is in turn connected to the rotary damper 73. The torsion bar can be used solely to connect the insulator base to the damper or it can also be used as a torsional spring. In FIGS. 22 and 23, the post insulator damper is applied on a 345 kV H-frame. The damper is mounted at the end of the crossarm 110. The torsion bar is anchored at a distance on the opposite side to act as a spring. The spring stiffness depends on the length and diameter of the torsion bar. The rotary damper shown is a friction damper similar to an automotive disc brake. A rotary vane hydraulic damper could also be used. When a longitudinal load is experienced, energy is absorbed and dissipated by the rotary damper as the insulator rotates. This will slow the swing of the insulator into the span letting the conductor down to its final position more slowly, reducing the impact of the falling conductor. This system can also be applied to the crossarm of a lattice steel tower by using the torsion bar to transmit the rotation of the insulator to the damper which would be mounted on a horizontal beam connected to the tower legs. There, the torque would be resolved into a couple formed by axial uplift and compression forces in the legs.

Figure 24A:
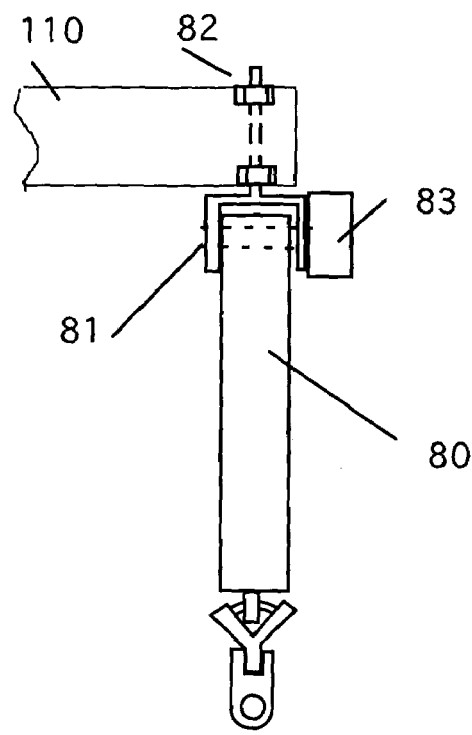
FIG. 24a is front view illustrating a combined rotating crossarm and post spring-damper in accordance with an embodiment of the invention.
Figure 24B:
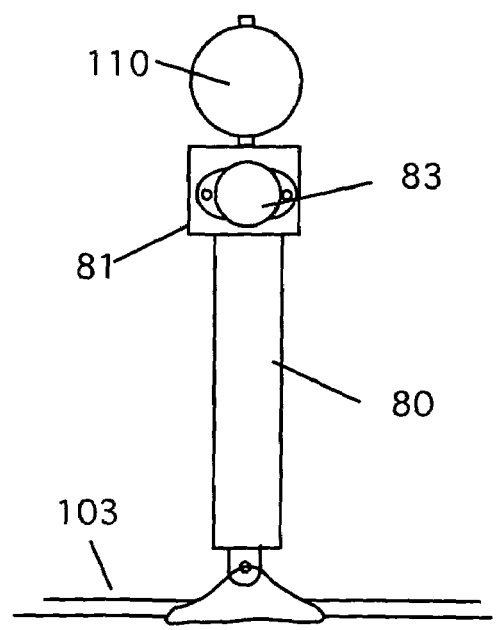
FIG. 24b is side view illustrating a combined rotating crossarm and post spring-damper in accordance with an embodiment of the invention.
Figure 24C:
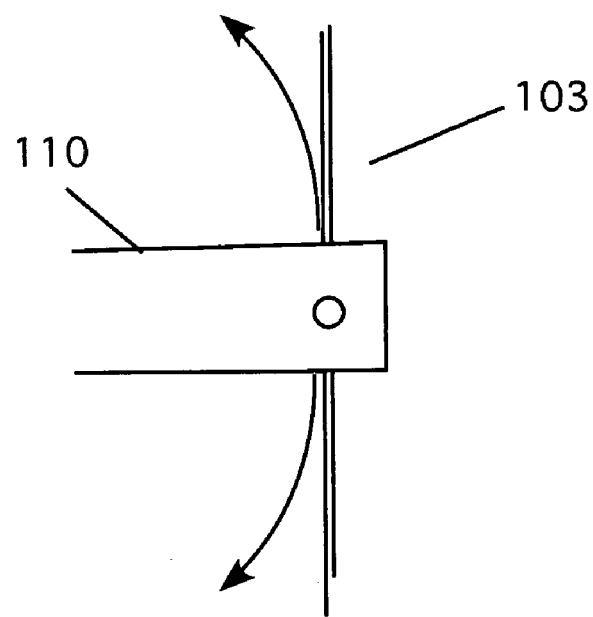
FIG. 24c is top view illustrating a combined rotating crossarm and post spring-damper in accordance with an embodiment of the invention.
Figure 24D:
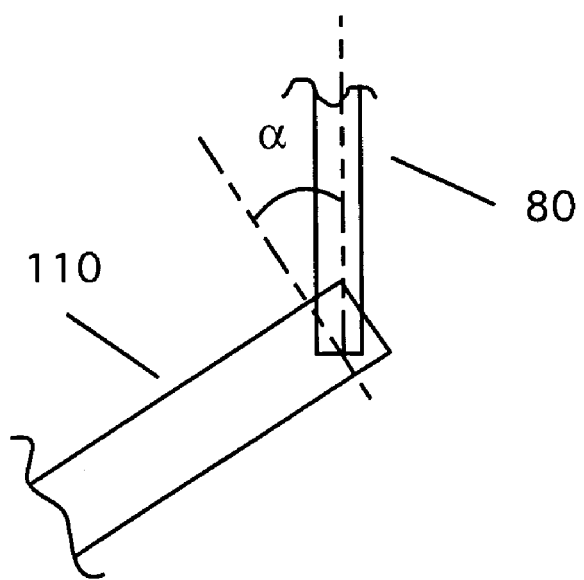
FIG. 24d is top view illustrating a combined rotating crossarm and post spring-damper in accordance with an embodiment of the invention showing the crossarm after rotation in a failure.

FIGS. 24a–d include top, front, and side views illustrating a combined rotating crossarm and post spring-damper in accordance with an embodiment of the invention. As shown in FIG. 24a, a rotating crossarm spring-damper can be combined with a post spring-damper by using a swivel as shown in FIGS. 24a and d. FIGS. 24a and 24b show a post insulator 80 mounted to a crossarm 110 using a clamp 81 secured to the crossarm by a swivel 82. A damper 83 is attached as shown. FIG. 24c shows the rotation permitted by the swivel 82. FIG. 24d shows the structure after a wire break. Here, the post 80 is shown pulled out to the side. The figure also shows the crossarm 110 rotated in the direction of the pulling force. Here, the angle α signifies the amount of rotation of the swivel. Note that the spring damper must force the rotation of the post 80 before the crossarm rotates enough to bind the post 80.

Figure 25:
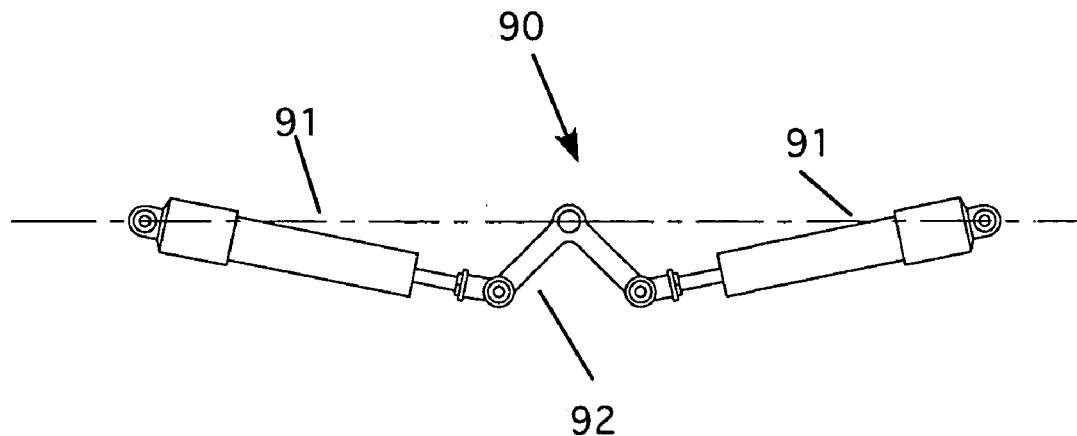
FIGS. 25 and 26 are side views illustrating a telescopic damper for post and rotating crossarm spring-dampers in the intact position and in the fully rotated position, respectively, in accordance with an embodiment of the invention.
Figure 26:
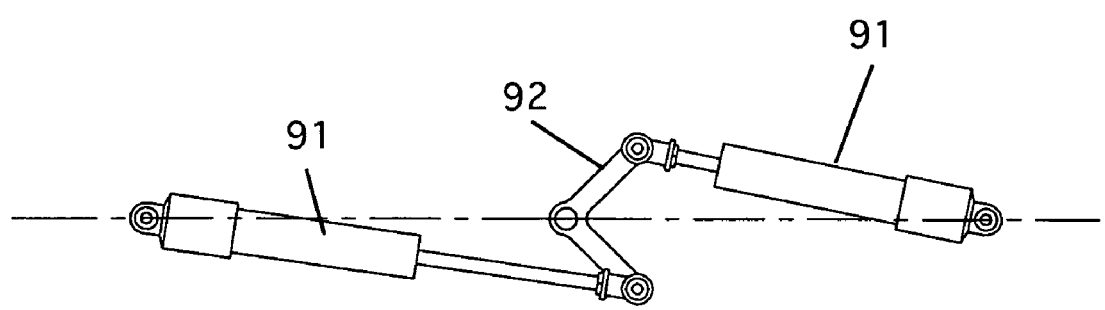

FIGS. 25 and 26 are side views illustrating a telescopic damper 90 for post and rotating crossarm spring-dampers in the intact position (FIG. 25) and in the fully rotated position (FIG. 26), respectively, in accordance with another embodiment of the invention. Here, two telescoping elements 91 are connected by a linkage 92 as shown.

Figure 26A:
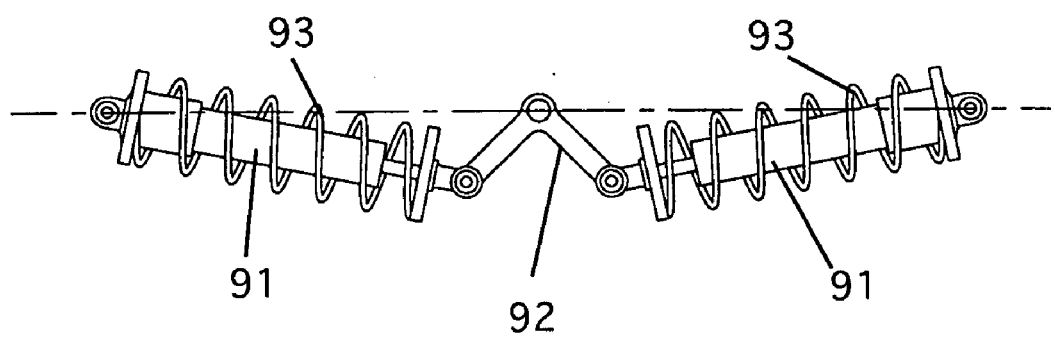
FIG. 26a is a detail view of telescopic dampers fitted with coil springs.

In the post and rotating crossarm spring-dampers shown in FIGS. 6 through 9, the springs are torsion bars, and the damping is provided by rotary dampers. However, according to one embodiment of the invention as shown in FIGS. 25 and 26, telescopic dampers can be substituted for the rotary dampers. A coil spring can be installed around the telescopic damper to replace the torsion bars. In FIG. 26a, the elements 91 are surrounded by the springs 93. These devices are installed in a manner consistent with the design to permit regular operation of the system.

Figure 27:
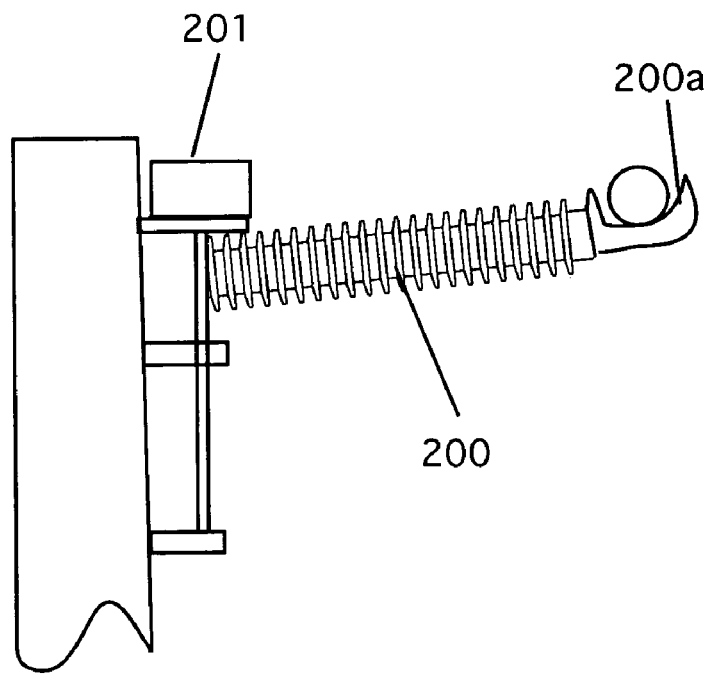
FIG. 27 is a side view illustrating a spring-damper for a horizontal post insulator in accordance with an embodiment of the invention showing a tension type clamp.
Figure 27A:
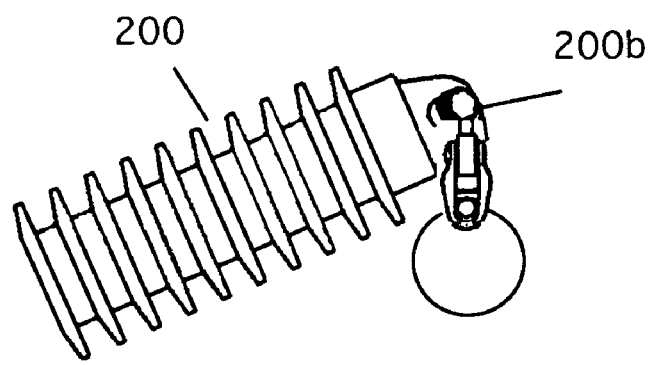
FIG. 27a is a side detail view illustrating a spring-damper for a horizontal post insulator in accordance with an embodiment of the invention, showing a y-clevis type suspension clamp.

The spring-dampers of the present invention may be used for a number of applications. For example, FIG. 27 is a side view illustrating a spring-damper for a horizontal post insulator in accordance with an embodiment of the invention. The horizontal post insulator 200 may include a composite insulator or a porcelain insulator with a trunnion clamp 200a or a y-clevis suspension clamp 200b (see FIG. 27a). A damper 201 and a torsion bar 202 are attached as shown. A spring-damper can also be used on a dead-end tower with a steel post (or any other suitable material) with the line dead-ended to the end of the steel post.

Figure 28:
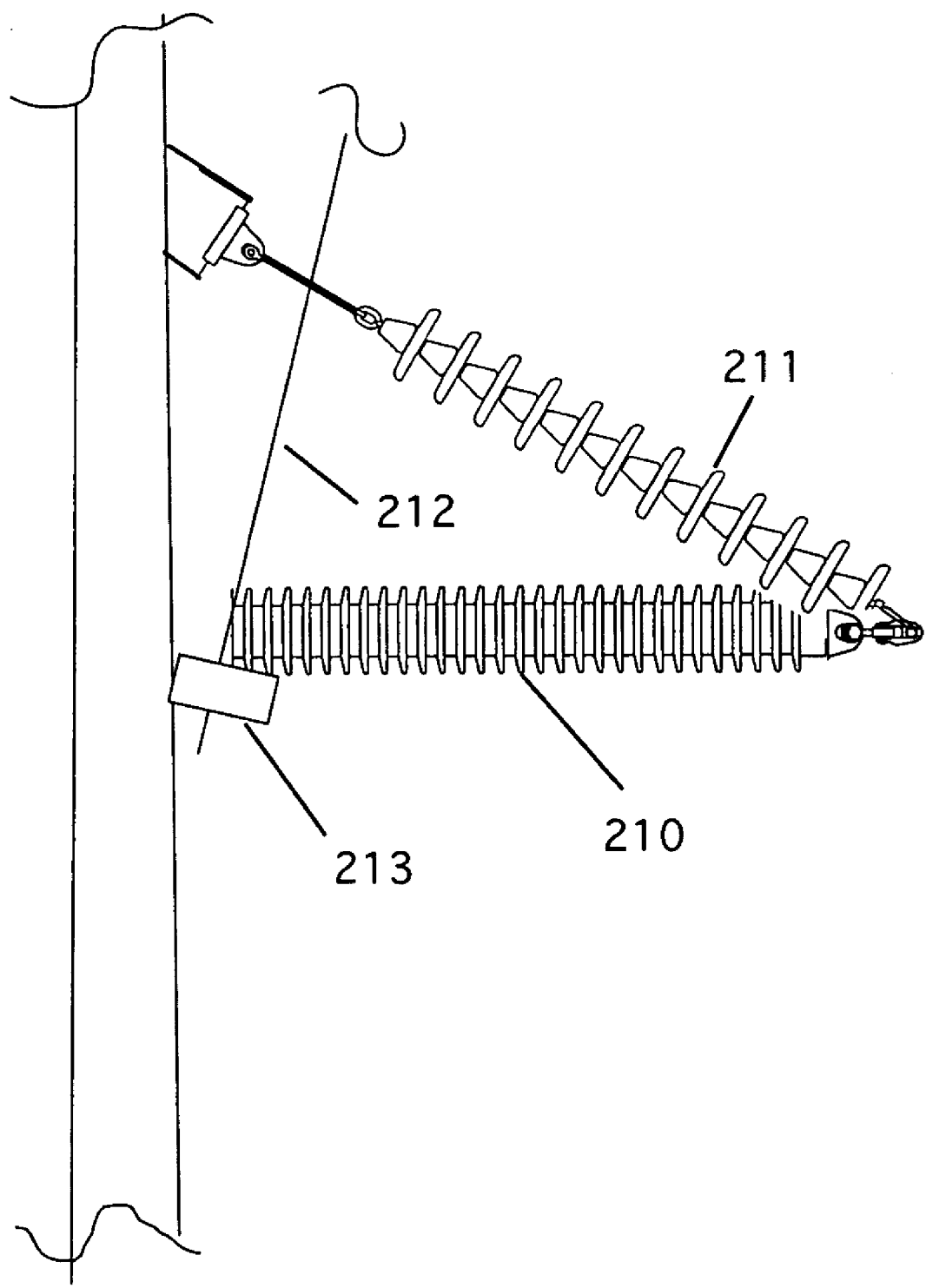
FIG. 28 is a side view illustrating a spring-damper for a horizontal V-string insulator in accordance with an embodiment of the invention.

FIG. 28 is a side view illustrating a spring-damper for a horizontal V-string insulator in accordance with an embodiment of the invention. Here, the insulator is made up of a post-type insulator 210 and a suspension-type insulator 211. The axis of the spring 212-damper 213 may be vertical or inclined, as shown. The upper arm of the horizontal V-string insulator may be a suspension insulator 211 which may be composed of a composite material, porcelain, toughened glass, etc. The lower arm of the horizontal V-sting insulator may be a post 210, which may be composed of a composite material, porcelain, etc.

FIGS. 29a–29c include top, front, and side views illustrating a spring-damper for a bus or transformer in accordance with an embodiment of the invention. FIG. 29a shows a spring-damper 220 is used to provide damped movement of a post insulator 221 to reduce shock loads from connections to other bus or substation equipment such as transformers. FIG. 29c is a side view of a bus taken along the lines 29c–29c of FIG. 29b. Here, spring-damper 224 is attached to the post 225 as shown.

As mentioned above, both the post spring-damper and the rotating crossarm spring-damper are effective in reducing the peak impact loads on towers and thus the potential for lines to cascade. The spring-dampers of the present invention allow for the manufacture of consistent products having consistent results. This is advantageous when compared to devices that use deformable components, as the consistency of such components is difficult to ensure. In addition, the operation of the spring-dampers of the present invention is independent of span weight. This is advantageous when compared to devices that use sliding clamps as such devices require calibration for span weight, aging, preloading of clamp keepers, etc. Furthermore, the spring-dampers of the present invention operate only under longitudinal loads. This is advantageous when compared to devices such as that of Ibanez et al., which operate on the resultant of the vertical, transverse, and longitudinal loads. Moreover, the spring-dampers of the present invention are advantageous in that they do not need to be replaced after operation.

Figure 31A:
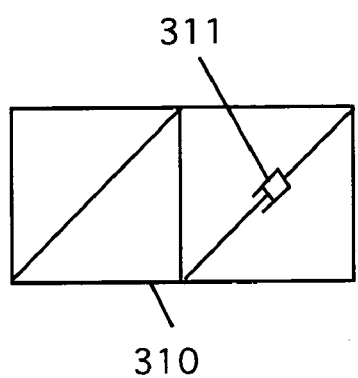
FIG. 31a is a plan view illustrating a square crossarm having a telescopic damper in accordance with an embodiment of the invention.
Figure 31B:
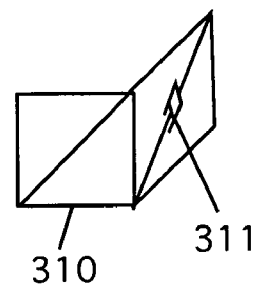
FIG. 31b is a plan view illustrating a square crossarm having a telescopic damper in accordance with an embodiment of the invention, showing the crossarm after rotation.

FIGS. 30a and 30b include side views illustrating a typical triangular arm 300 for a transmission tower 301. However, the crossarms on double circuit lattice steel towers and on the outside phases of single circuit towers can incorporate shock damping. Using a square arm instead of a triangular arm provides a place to install a damper for longitudinal impact loads. FIGS. 31*a* and 31*b* are plan views illustrating a square crossarm 310 having a telescopic damper 311 in accordance with an embodiment of the invention (see e.g., FIGS. 25 and 26). FIG. 30*a* shows the arm in a normal position. FIG. 30*b* shows the in a failed mode, with the damper extended. FIG. 31*b* shows the shock absorber 311 extending in tension, however, with motion in the opposite direction the shock absorber would be placed in compression. Tubular hydraulic shock absorbers, similar to those used in cars, can be manufactured to operate in both directions, as can friction dampers. Both tubular hydraulic dampers and friction dampers are well known in the art. The shock absorbing square crossarm absorbs at least some of the energy released during a broken wire event and reduces the residual static tension in the wires due to the movement of the insulator attachment point into the intact span.

A broken wire or similar failure cannot progress into a cascading failure of many structures if the wire is restrained from moving longitudinally (along the axis of the wire). If the wire does not move longitudinally, the suspension insulators at the next tower cannot rotate far enough to overload the tower. Traditionally, full dead-end towers have been used to fulfill this role. On a full dead-end tower, an insulator and hardware assembly is installed in-line with the axis of the wire supporting the tension in the wire by connecting it to a rigid tower. If the wires break on one side of the tower, the tower is strong enough to support the wires on the opposite side preventing a progressive collapse.

The disadvantage of using rigid dead-end towers to contain the progressive collapses known as cascades is that they add potential failure points that can themselves trigger a cascade. If any component of the dead-end insulator and hardware assembly fails, it is equivalent to a broken wire in its effect. In contrast, the failure of a suspension insulator on a tangent tower is not likely to lead to a longitudinal cascade. It is advantageous to control the movement of wire without using dead-end structures. The longitudinal V-string controls the longitudinal movement of the wire and acts as an effective dead-end without introducing elements whose failure can trigger a cascade.

Referring now to FIGS. 32–44, additional embodiments employing the longitudinal V string are shown.

Figure 32:
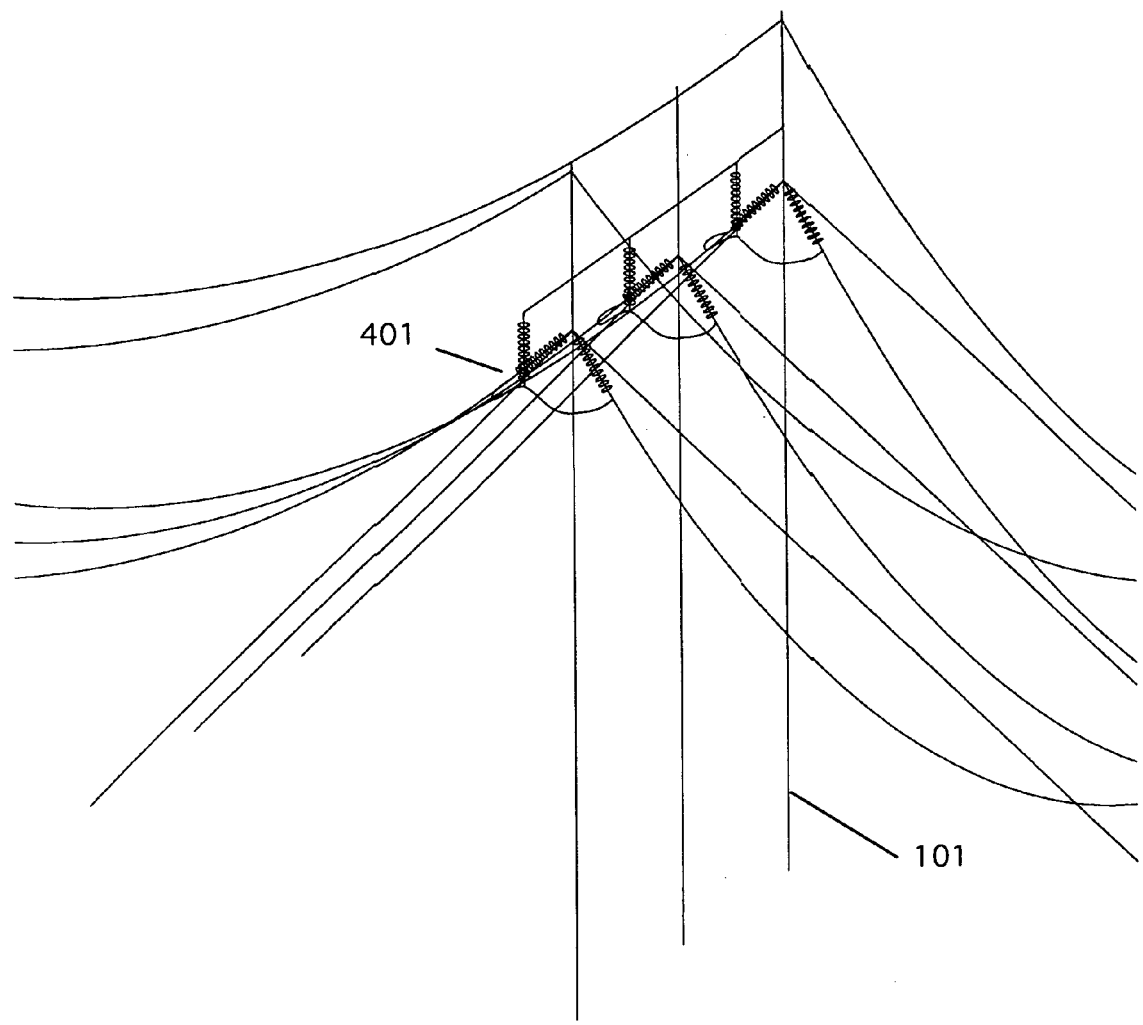
FIG. 32 shows a dead-end structure as prior art.
Figure 33:
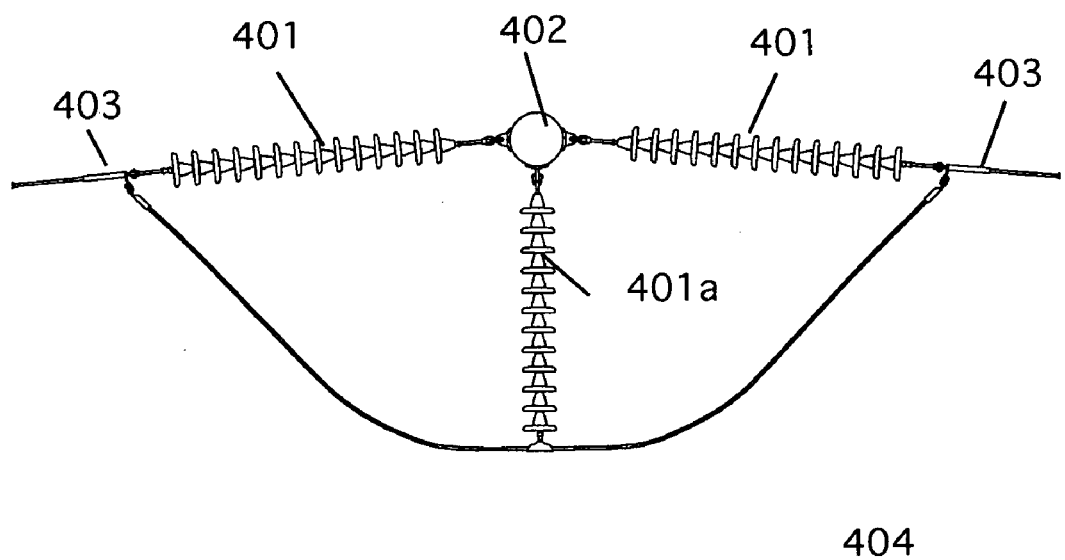
FIG. 33 is a detail view of a typical dead-end insulator assembly as prior art

As noted above, FIG. 1 shows a dead-end structure and two suspension structures that are on a straight section of line without any turns known as a tangent. FIG. 32 shows details of the dead-end structure 101. Dead-end structures may be self supporting lattice steel towers, self supporting tubular steel towers, guyed poles (shown) constructed of wood, concrete, latticed steel, tubular steel or latticed aluminum. In FIG. 32, the dead-end insulator assemblies 401 are in-line with the axis of the conductor and are attached to the pole where the tension is resisted by guys on the opposite side of the pole. Dead-end insulator assemblies are shown in more detail in FIG. 33 attached to a crossarm 402. The dead-end insulator assembly consists of a dead-end clamp 403 attached to the conductor; these are typically either a bolted type or a compression dead-end (shown) that is fastened to the conductor by swaging. The dead-end clamp is attached to the insulators by various pieces of forged and cast hardware; a socket clevis with provision for hot-line tools is shown. The insulators are attached to the vang 403 on the tower by additional hardware; in this case, an anchor shackle and oval eyeball are shown. The current is carried around the structure by the jumper conductor 404 which is supported by a jumper insulator assembly 401*a*. With the dead-end insulator in-line with the conductor, the failure of any of its many components is equivalent to the conductor itself failing.

As discussed above, FIGS. 3 and 4 show a typical suspension insulator assembly as prior art. When the conductor or dead-end insulator at a neighboring structure breaks, the suspension insulator swings in line with the conductor imposing a large impact load on the structure. It also does not adequately restrain the longitudinal movement of the conductor. However, using a longitudinal V-string system, as discussed below, both reduces the impact load and restrains the movement of conductor at the next structure.

For these reasons, the longitudinal V assembly is considered to be the preferred embodiment of the invention.

Figure 34:
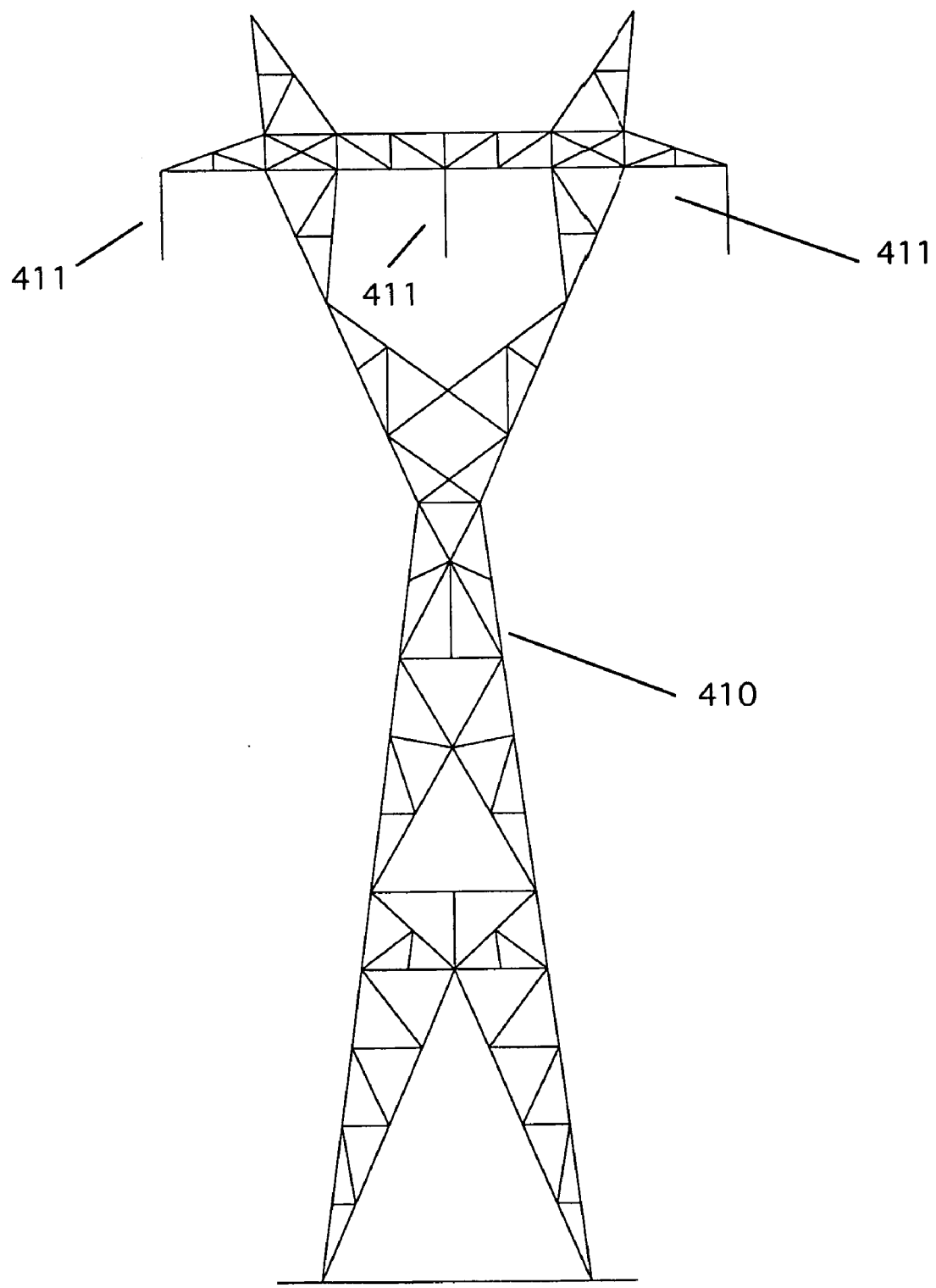
FIG. 34 shows a lattice steel tower with longitudinal V insulators installed.
Figure 35:
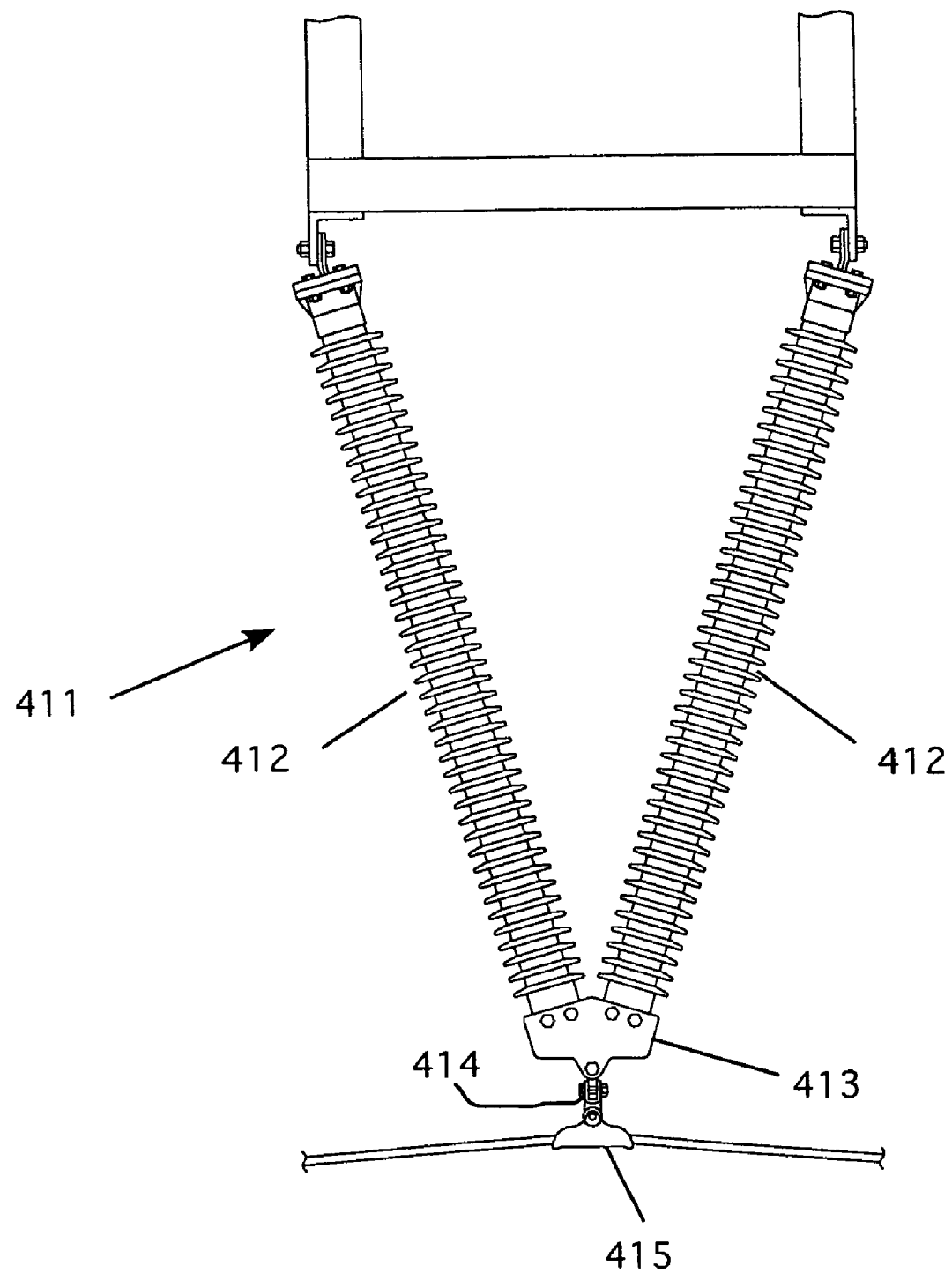
FIG. 35 shows a side view of the longitudinal V insulator.

FIG. 34 shows a lattice steel tower 410 with longitudinal V insulators 411 installed. FIG. 35 shows a side view of the longitudinal V insulator 411. The Longitudinal V consists of two composite post insulators 412 in a "V" configuration. They are connected to the conductor through a bracket 413, which bolts to the insulators. In the particular case shown, the insulators are equipped with end fittings for a standard bendable pole bracket as currently use by some manufacturers; however brackets to accommodate other standard end fittings could also be used. A vang 414 is flexibly attached to the bracket using a bolt. A non-slip suspension clamp 415 is attached to the vang with a standard clevis-eye although many other attachment configurations could be used, for example direct connection of a trunnion clamp.

Figure 36:
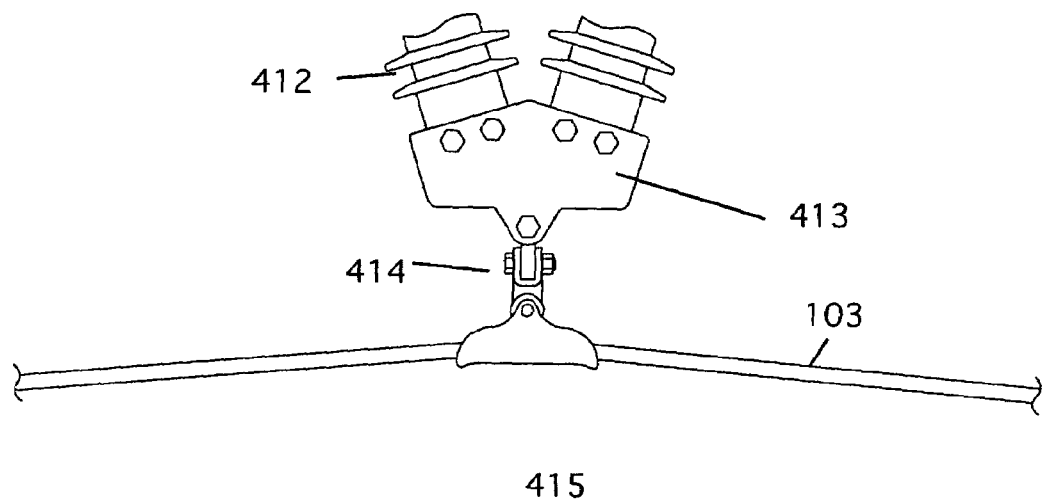
FIG. 36 shows a detail of the bracket that connects the composite post insulators to the conductor in its normal position.
Figure 37:
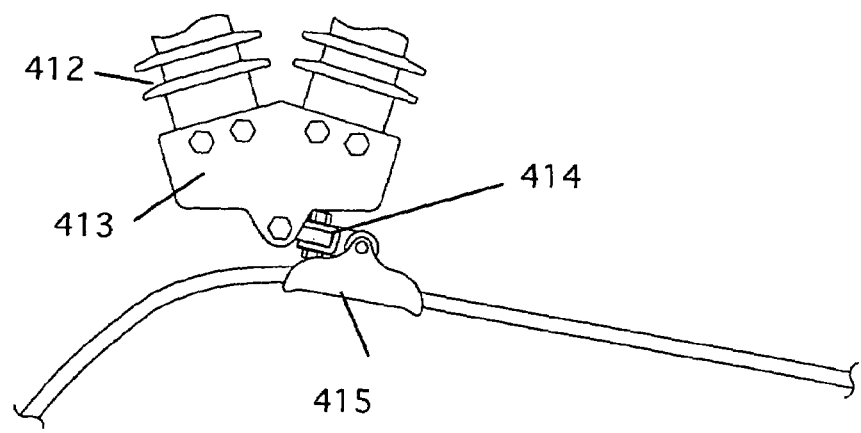
FIG. 37 shows the bracket after a broken wire or other failure releases tension in the wire on one side of the tower.

FIG. 36 shows a detail of the bracket 413, which connects the composite post insulators to the conductor in its normal position. FIG. 37 shows the bracket after a broken wire or other failure releases tension in the wire on one side of the tower.

Figure 38:
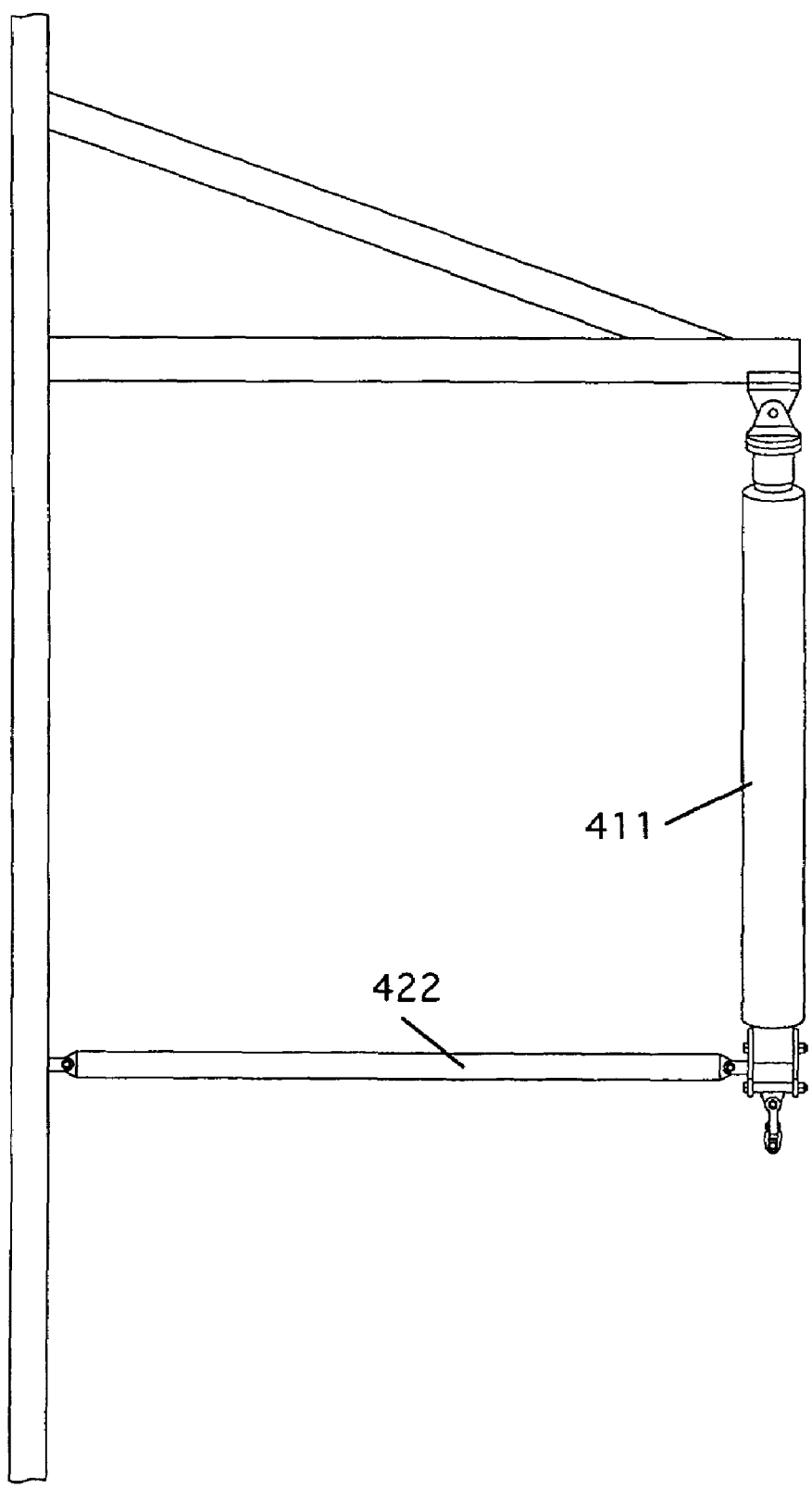
FIG. 38 shows the Longitudinal V looking along the axis of the conductor. An optional strut insulator may be used to restrict the transverse swing of the Longitudinal V.
Figure 39:
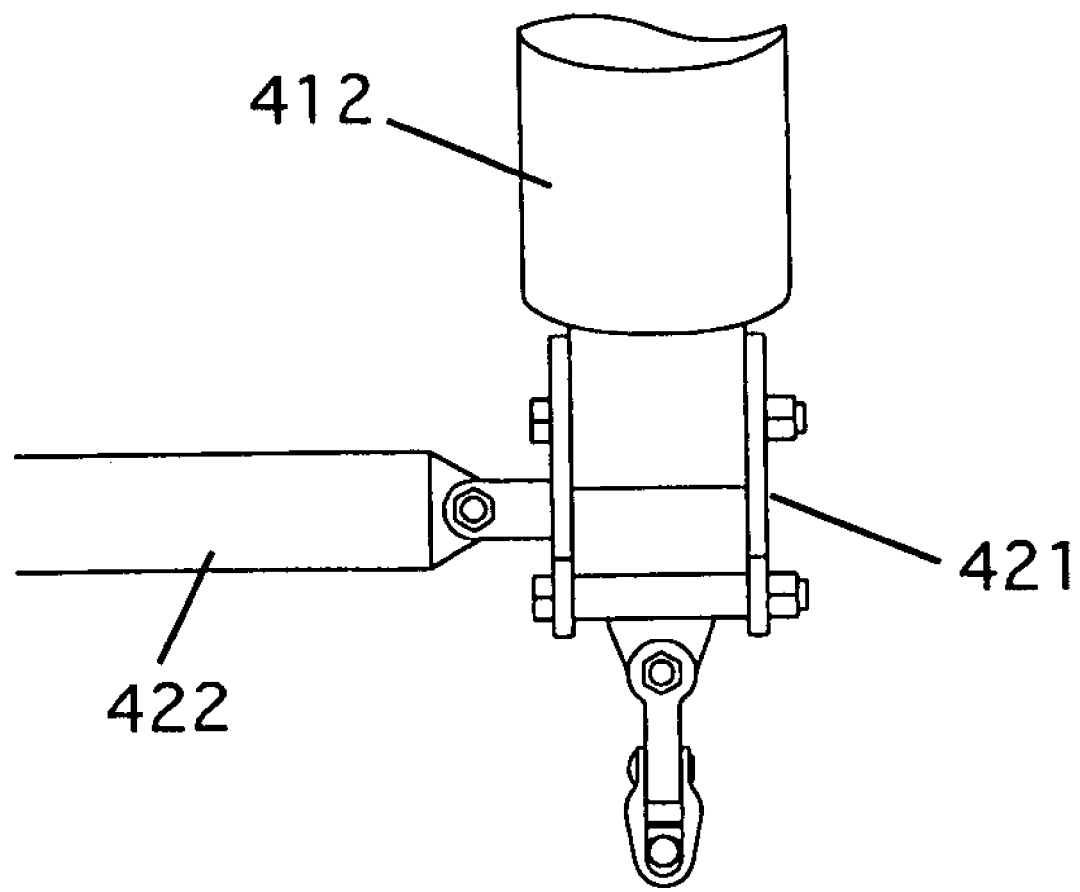
FIG. 39 shows the bracket in more detail.

FIG. 38 shows the Longitudinal V 411 looking along the axis of the conductor. An optional strut insulator 420 may be used to restrict the transverse swing of the Longitudinal V. FIG. 39 shows the mounting bracket 421 for this strut insulator in more detail.

Figure 40:
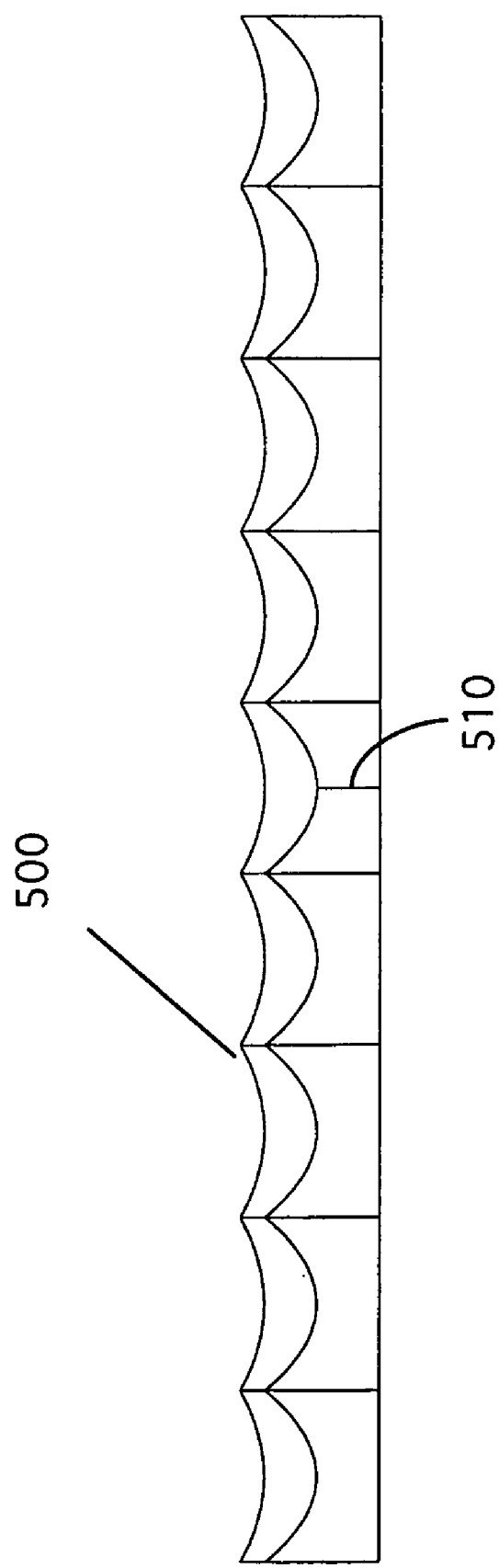
FIG. 40 shows a long tangent of suspension towers with a special tower shown.
Figure 41:
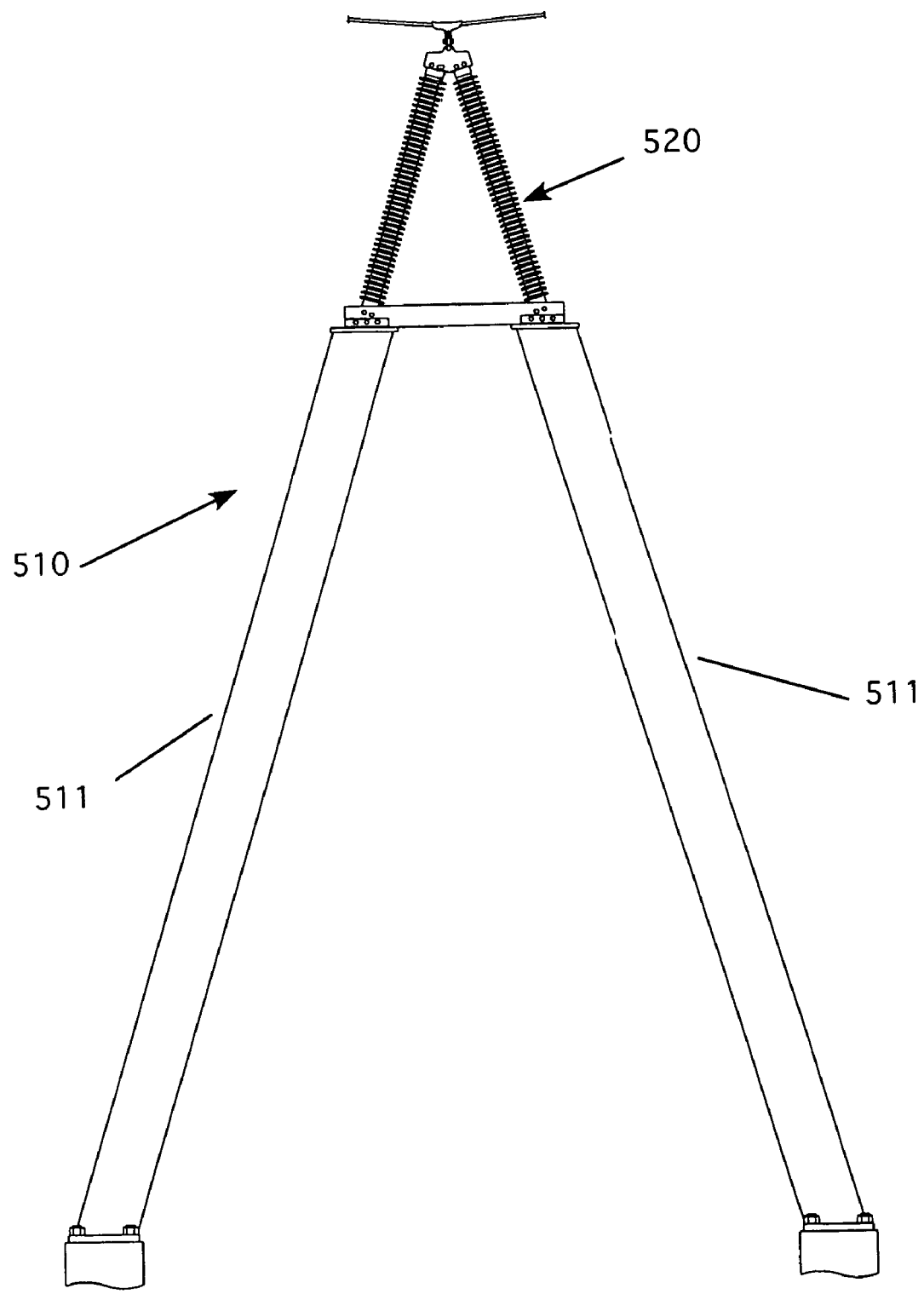
FIG. 41 shows a longitudinal V string inset in the line to control the conductor movement and stop progressive collapses.
Figure 42:
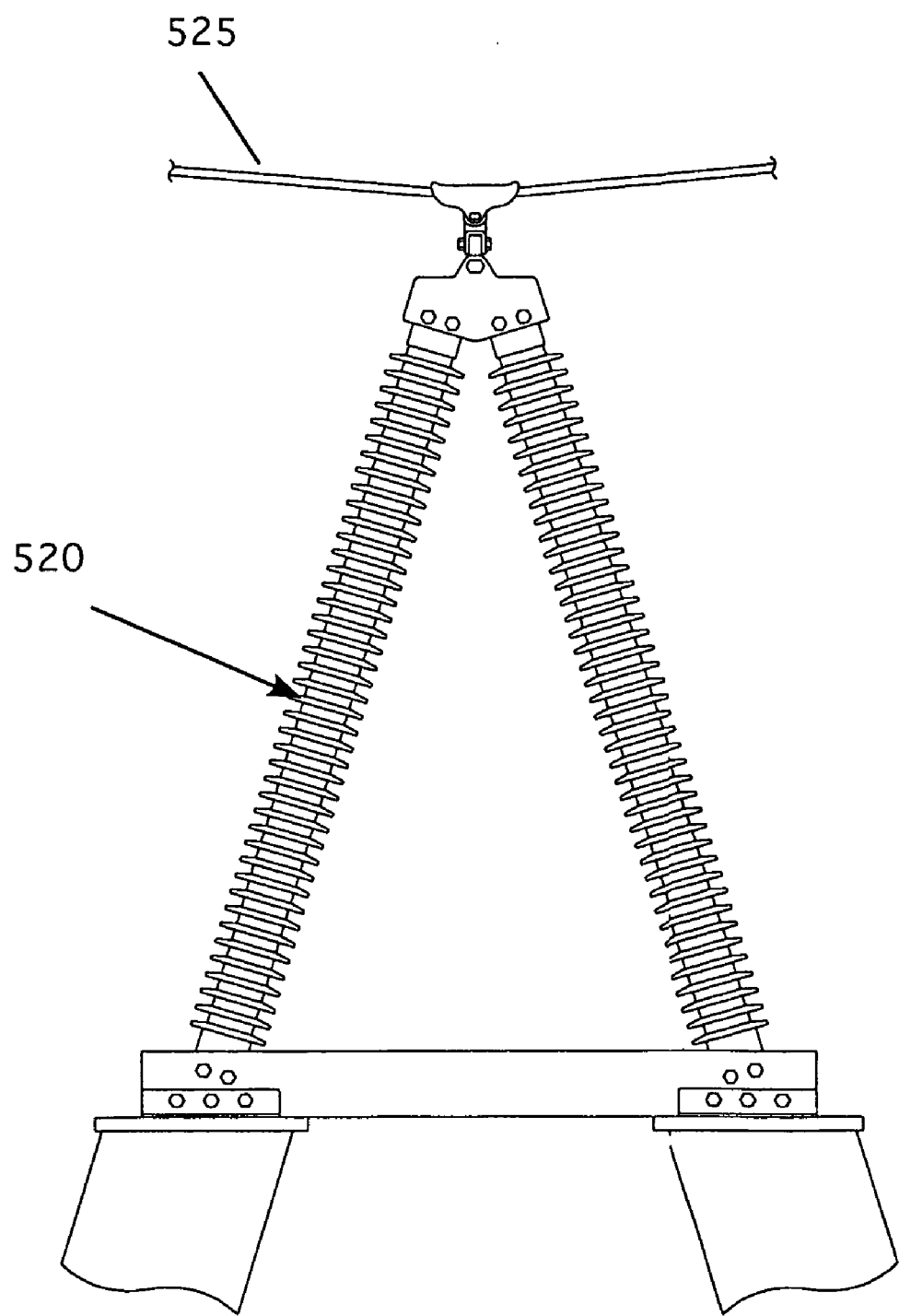
FIG. 42 shows the longitudinal V in more detail.
Figure 43:
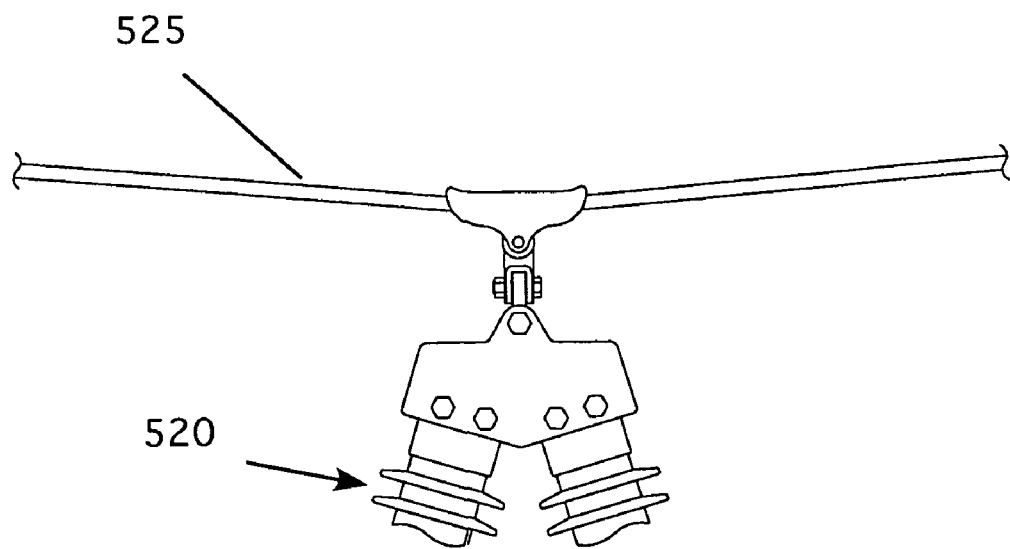
FIG. 43 shows the conductor in its normal position on the longitudinal V.
Figure 44:
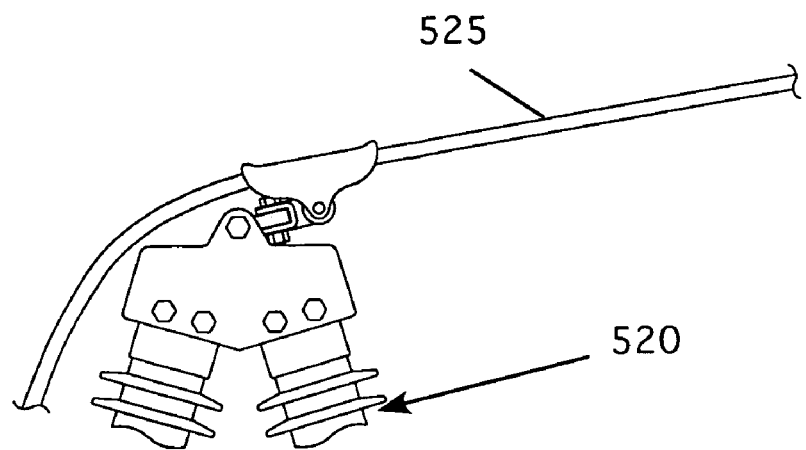
FIG. 44 shows the clamp after a broken wire or other failure in the conductor tensioning system.

FIG. 40 shows a long tangent of suspension towers 500 with a special tower 510 shown in FIG. 41 inset in the line to control the conductor movement and stop progressive collapses. The tower 510 has two angled legs 511 as shown and a Longitudinal V 520 shown mounted upside down. FIG. 42 shows the longitudinal V 520 in more detail. This structure is similar to that shown in FIG. 35. FIG. 43 shows the conductor 525 in its normal position. FIG. 44 shows the longitudinal V 520 after a broken wire or other failure in the conductor tensioning system.

Figure 45:
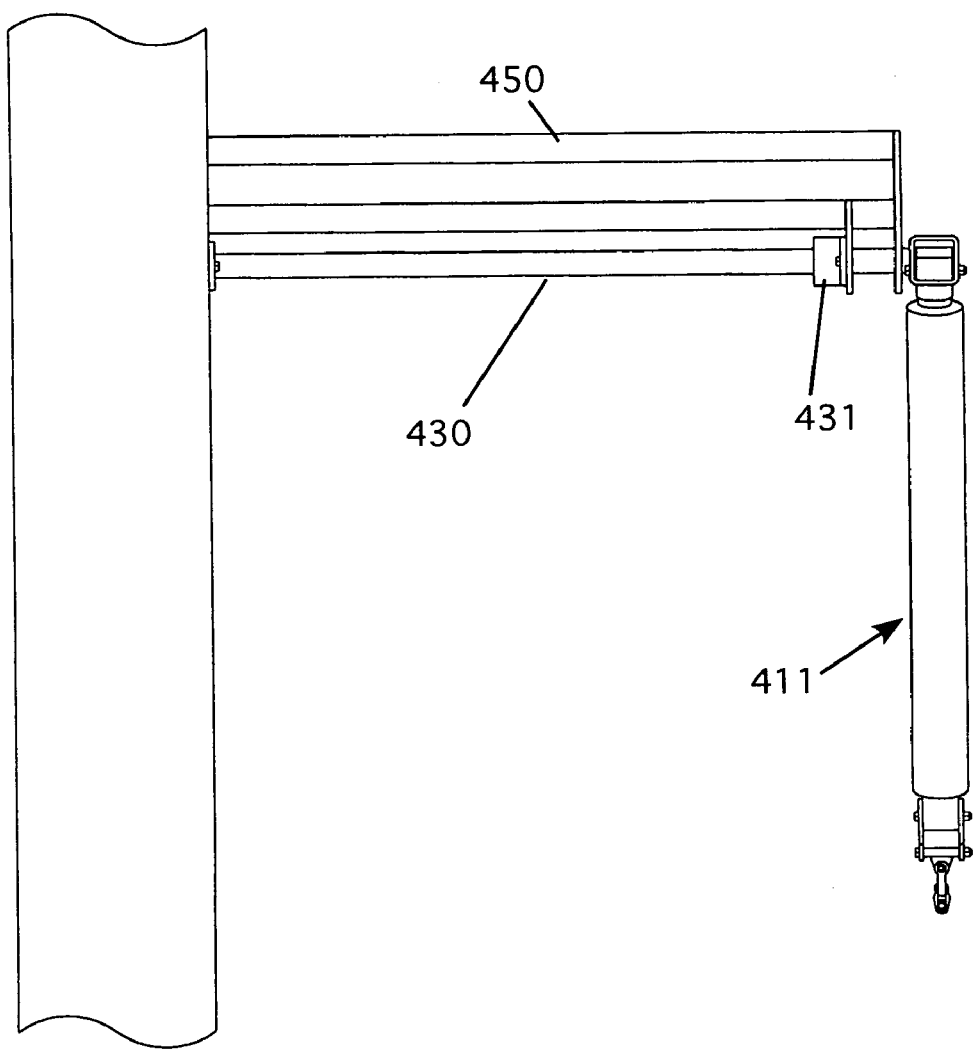
FIG. 45 is a side view of a longitudinal V insulator assembly that has a spring and damper system attached.

Although the longitudinal V system does not need dampers and springs, it can have them included as shown in FIG. 45. FIG. 45 shows a side view of a tower with a longitudinal V assembly 411 that is suspended from a crossarm 450. A torsion bar 430 and damper 431 are attached to the longitudinal V assembly 411 as shown, using the techniques discussed above.

In the preceding, it will be understood that any insulator having the requisite bending and axial strength may be used rather than or in addition to a composite insulator. In addition, it will be understood that the spring-dampers described above may use springs only, dampers only, or a combination of strings and dampers. It addition, it will be understood that the spring-dampers described above can use a torsion bar and rotary damper, a torsion bar and telescopic dampers, coil springs and rotary dampers, coil springs and telescopic dampers, or other forms of springs and dampers, for example, leaf springs. Furthermore, it will be understood that the rotary and telescopic dampers described above need not be purely viscous or purely frictional. Dampers have properties varying from aerodynamic (i.e., damping force proportional to velocity squared) to viscous (i.e., damping force proportional to velocity) to friction or coulomb dampers (i.e., constant damping force regardless of velocity). In the same way that telescopic viscous dampers can be linked to the axle, a pure sliding friction damper can also be used.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for reducing a shock load having a longitudinal direction along a power line coupled through an insulator to a crossarm of a transmission tower, comprising:
   a) a rotary damper coupled between the insulator and the crossarm for rotating by the insulator in the longitudinal direction in response to the shock load, the damper having an axle to which the insulator is rotatably coupled; and
   b) a torsion bar coupled at a first end to the axle and at a second end to the crossarm for resisting rotation of the insulator, whereby at least a portion of the shock load is absorbed.

2. The device of claim 1 wherein the insulator is selected from the group of: a composite post insulator, a porcelain post insulator, and a post.

3. The device of claim 1 wherein the rotary damper is selected from the group of: a rotary viscous damper, a rotary vane damper, and a rotary friction damper.

4. A device for reducing a shock load having a longitudinal direction along a power line coupled through an insulator to a crossarm of a transmission tower, comprising:
   a) a rotary damper coupled between the crossarm and the tower for rotating by the crossarm in the longitudinal direction in response to the shock load, the damper having an axle to which the crossarm is rotatably coupled; and
   b) a torsion bar coupled at a first end to the axle and at a second end to the tower for resisting rotation of the crossarm, whereby at least a portion of the shock load is absorbed.

5. The device of claim 4 wherein the rotary damper is selected from the group of: a rotary viscous damper, a rotary vane damper, and a rotary friction damper.

* * * * *